United States Patent
Sako et al.

(10) Patent No.: US 7,216,228 B2
(45) Date of Patent: May 8, 2007

(54) RECORDING MEDIUM RECORDING AND/OR REPRODUCTION APPARATUS, RECORDING AND/OR REPRODUCTION METHOD

(75) Inventors: Yoichiro Sako, Tokyo (JP); Takashi Sato, Tokyo (JP); Takao Ihashi, Chiba (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 10/432,855

(22) PCT Filed: Sep. 27, 2002

(86) PCT No.: PCT/JP02/10077

§ 371 (c)(1),
(2), (4) Date: May 28, 2003

(87) PCT Pub. No.: WO03/030166

PCT Pub. Date: Apr. 10, 2003

(65) Prior Publication Data

US 2004/0047259 A1 Mar. 11, 2004

(30) Foreign Application Priority Data

Sep. 28, 2001 (JP) ............................. 2001-303544

(51) Int. Cl.
*H04K 9/00* (2006.01)
*G06F 7/04* (2006.01)
(52) U.S. Cl. ....................... 713/168; 726/30; 369/53.21
(58) Field of Classification Search ..................... None
See application file for complete search history.

(56) References Cited

U.S. PATENT DOCUMENTS

| | | | | |
|---|---|---|---|---|
| 6,144,745 A | * | 11/2000 | Akiyama et al. | 380/232 |
| 6,434,535 B1 | * | 8/2002 | Kupka et al. | 705/24 |
| 6,615,353 B1 | * | 9/2003 | Hashiguchi | 713/185 |
| 6,715,076 B1 | * | 3/2004 | Challapali | 713/176 |
| 6,799,271 B2 | * | 9/2004 | Kugai | 713/168 |
| 6,832,316 B1 | * | 12/2004 | Sibert | 713/181 |
| 6,832,319 B1 | * | 12/2004 | Bell et al. | 713/193 |
| 6,912,634 B2 | * | 6/2005 | Ripley et al. | 711/164 |
| 6,922,778 B2 | * | 7/2005 | Hild et al. | 713/181 |
| 6,941,461 B2 | * | 9/2005 | Carro et al. | 713/181 |
| 7,111,175 B2 | * | 9/2006 | Ripley | 713/193 |

FOREIGN PATENT DOCUMENTS

| | | |
|---|---|---|
| JP | 10-207946 A | 8/1998 |
| JP | 2000-99401 A | 4/2000 |
| JP | 2000-148861 A | 5/2000 |
| JP | 2001-6179 A | 1/2001 |
| JP | 2001-23350 A | 1/2001 |
| JP | 2001-60286 A | 3/2001 |
| JP | 2001-135021 A | 5/2001 |

* cited by examiner

*Primary Examiner*—Thang V. Tran
(74) *Attorney, Agent, or Firm*—Wolf, Greenfield & Sacks, P.C.

(57) ABSTRACT

A method for reproducing a recording medium comprising reading out identification data from a recording medium having recorded thereon data and the identification data, which identification data includes entity identification data and detection data. The detection data is generated using at least the entity identification data and indicates whether or not the entity identification data at least is authentic data. The identification recorded on the recording medium is read out, detection data is generated based on the entity identification data of the identification data as read out and the detection data extracted from the read-out identification data is compared to the generated detection data. When, as a result of comparison, the detection data extracted from the read-out identification data is coincident with the generated detection data, the outputting of the data read out from the recording medium is permitted.

31 Claims, 13 Drawing Sheets

RECORDING MEDIUM RECORDING AND/OR REPRODUCTION APPARATUS, RECORDING AND/OR REPRODUCTION METHOD

TECHNICAL FIELD

This invention relates to a method and an apparatus for a recording medium on which are recorded contents data downloaded over a network.

BACKGROUND ART

There is a contents distributing system for distributing contents data, such as music, over the network, such as EMD (electronic music distribution). With this system, a user terminal device, for example, may access a server device, where the contents data are stored, to download desired contents data. For payment, the private information, such as a credit card number, a secret number or the Web money, is sent from the user terminal device to the server device.

In such system, payment is by transmitting the private information, such as credit card number, secret number or the Web money from the terminal device to the server device, over the network, so that a cumbersome operation is needed in inputting the private information. Moreover, there is a risk that the private information may be illicitly acquired by a third party for unauthorized use.

As a means for combating this problem, there is a payment system employing a pre-paid recording medium. In this system, the remaining recordable volume of the contents data is recorded on the recording medium purchased by the user. When the terminal device accesses a server device to download the contents data desired by the user, data indicating the recordable volume is transmitted from the terminal device to the server device. The terminal device receives the downloaded contents data and the updated data indicating the recordable data volume to record these data on the recording medium.

With the recording medium used in this system, the contents data and the data indicating the recordable data volume need to be updated from time to time, and hence the write-once or rewritable recording medium is used. Consequently, the recordable data volume, recorded on the recording medium, may be manipulated by a user with a malignant intention, as a result of which the contents data may be repeatedly downloaded by the user with a malignant intention, thus detracting from the benefit of the system supervisor or the copyright owner.

DISCLOSURE OF THE INVENTION

It is therefore an object of the present invention to provide a recording medium a data recording and/or reproducing method and a data recording and/or reproducing apparatus, whereby the contents data may be protected to protect the benefit of the system manager supervising the contents data and the copyright owner of the contents data.

It is another object of the present invention to provide a recording medium a data recording and/or reproducing method and a data recording and/or reproducing apparatus, whereby it is possible to prohibit manipulation of e.g., the recordable data volume.

In one aspect, the present invention provides a method for reproducing a recording medium including reading out identification data from a recording medium, having recorded thereon data and identification data, the identification data including entity identification data and detection data, the detection data being generated using at least the entity identification data, the detection data indicating whether or not the entity identification data at least is authentic data. The method also includes generating detection data based on the identification data read out, comparing detection data extracted from the read-out identification data to the generated detection data, and permitting the outputting of the data read out from the recording medium when the results of comparison indicate the coincidence of the detection data extracted from the read-out identification data with the generated detection data.

In another aspect, the present invention provides an apparatus for reproducing a recording medium including a head unit for scanning a recording medium having recorded thereon data and identification data, the identification data including entity identification data and detection data, the detection data being generated using at least the entity identification data, the detection data indicating whether or not the entity identification data at least is authentic data. The apparatus also includes a signal processing unit for performing signal processing for reproducing an output signal from the head unit, a generating unit for generating detection data based on the entity identification data of the identification data read out from the recording medium, a comparator for comparing detection data extracted from the identification data read out to detection data generated by the generating unit, and an outputting unit supplied with output data from the signal processing unit for limiting the outputting of the output data from the signal processing unit by output data derived from the results of comparison from the comparator.

In still another aspect, the present invention provides a method for recording a recording medium, in which the method includes transmitting identification data read out from a recording medium, having recorded thereon the entity identification data, data indicating the volume of recordable data, and detection data, which detection data is generated using the entity identification data and the recordable data volume indicating data, and indicates whether or not at least the entity identification data and the recordable data volume indicating data are authentic data. The method also includes recording the identification data including updated recordable data volume indicating data, transmitted along with contents containing data, on the recording medium.

In still another aspect, the present invention provides a data recording and/or reproducing method including reading out identification data from a recording medium having recorded thereon identification data, the identification data including entity identification data and detection data, the detection data being generated using at least the entity identification data, the detection data indicating whether or not the entity identification data at least is authentic data. The method also includes transmitting the read-out data and selection data to a server device holding plural data, the server device generating detection data based on the entity identification data of the identification data, comparing the so generated detection data and detection data extracted from the transmitted identification data, the server device reading out and transmitting data corresponding to the selection data in case of coincidence of the generated detection data and the detection data extracted from the transmitted identification data, and recording the transmitted data on or reproducing the transmitted data from the recording medium, on the recording medium.

In still another aspect, the present invention provides a recording medium including a data recording area where data is recorded, and a management data area where there is recorded identification data inclusive of entity identification data and detection data generated using at least the entity identification data. The detection data indicates whether or not the entity identification data at least is authentic data.

The identification data includes data indicating the volume of data recordable on the recording medium, along with the entity identification data, and the detection data generated is generated based on the entity identification data and on the data indicating the volume of recordable data.

In yet another aspect, the present invention provides a recording and/or reproducing apparatus for a recording medium, in which the apparatus includes a head unit for scanning the recording medium having recorded thereon identification data, the identification data including entity identification data and detection data, the detection data being generated using at least the entity identification data and indicating whether or not the entity identification data at least is authentic data. The apparatus also includes a signal processing unit for performing signal processing for reproducing an output signal from the head unit, a communication unit for transmitting the identification data read out from the head unit and selection data and for receiving transmitted data corresponding to the selection data, a generating unit for generating the detection data based on the entity identification data of the identification data read out from the recording medium, a comparator unit for comparing the detection data extracted from the read-out identification data and the detection data generated by the generating unit, an outputting unit supplied with the output data from the signal processing unit and adapted for controlling the outputting of the output data from the signal processing unit by output data derived from the results of comparison from the comparator and a recording signal processing unit for performing signal processing of recording the data corresponding to the selection data received via the communication unit on the recording medium to send the processed data to the head unit.

Other objects, features and advantages of the present invention will become more apparent from reading the embodiments of the present invention as shown in the drawings.

BEST MODE FOR CARRYING OUT THE INVENTION

Figure 1:
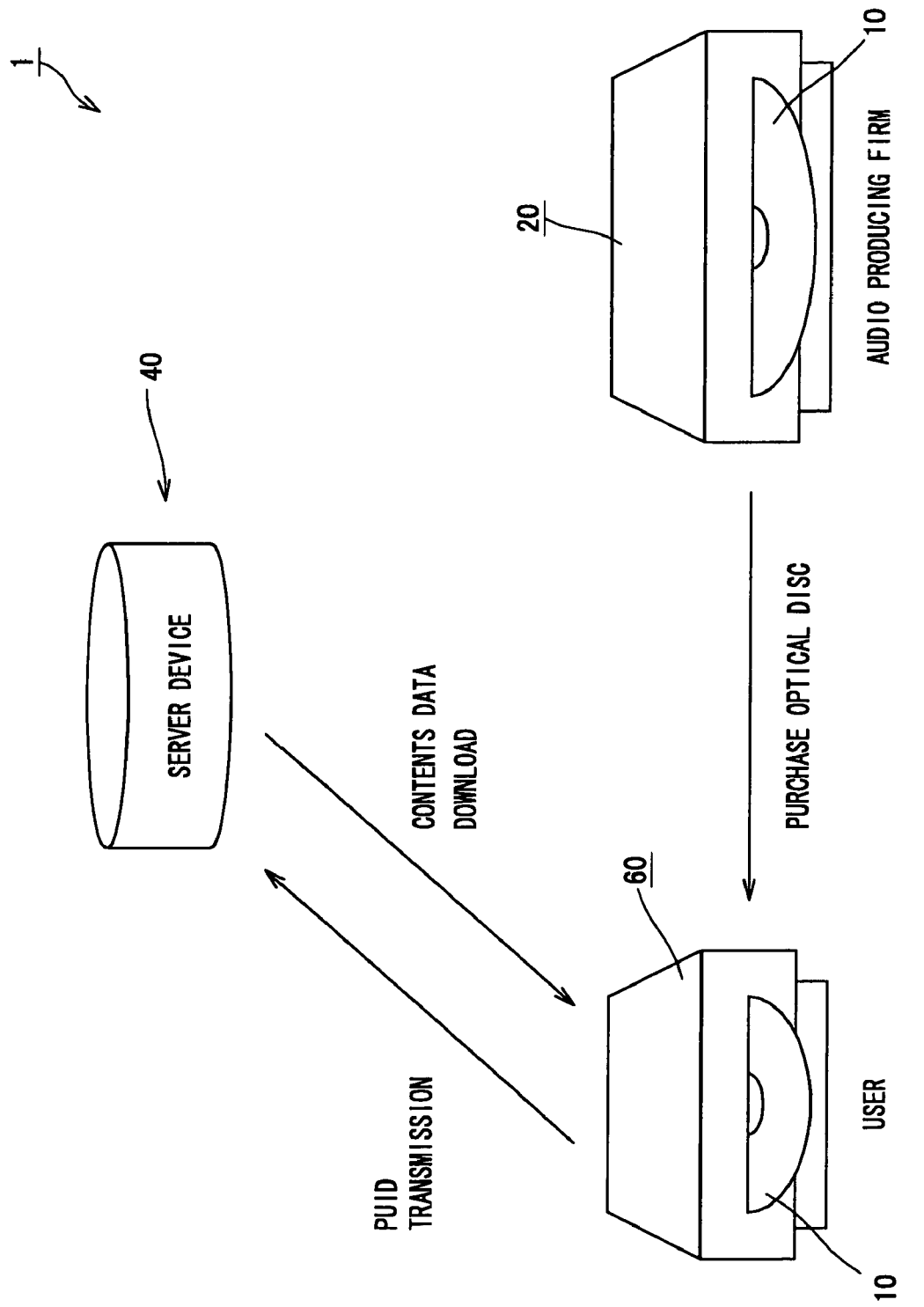
FIG. 1 illustrates a downloading system for contents data embodying the present invention.

Referring to the drawings, an optical disc, a method and an apparatus for recording data on this optical disc and a method and an apparatus for reproducing data from the optical disc, according to the present invention, will be explained in detail.

The present invention is applied to a system for distributing contents data, such as music, over the network, such as EMD (electronic music distribution). In this contents data distribution system 1, shown in FIG. 1, a user purchases a write-once or rewritable optical disc, on which can be recorded the contents data, accesses a server device 40, over a network, by a data recording and/or reproducing device 60 he/she owns, downloads the desired contents data from a server position, and records the downloaded contents data on the purchased optical disc 10. That is, the present system 1 is of a pre-paid system un which the price for the user to download contents data is paid at the time of purchasing the optical disc 10 on which to record the contents data.

In this optical disc 10, used in the system 1, there is pre-recorded data indicating the recordable volume of the contents data. This data indicating the recordable volume is e.g., such data indicating that 1000 yen equivalent of contents data or 10-minute equivalent of contents data can be recorded. If, for downloading contents data to the optical disc 10, the user's recording and/or reproducing device 60 accesses the server device 40, the user's recording and/or reproducing device transmits the data on the recordable volume, recorded on the optical disc 10, along with a contents data download request, to the server device 40, and receives the corresponding contents data and data on the remaining recordable data volume, updated by the server device 40, to record the contents data and the data on the remaining recordable data volume on the optical disc 10.

Figure 2:
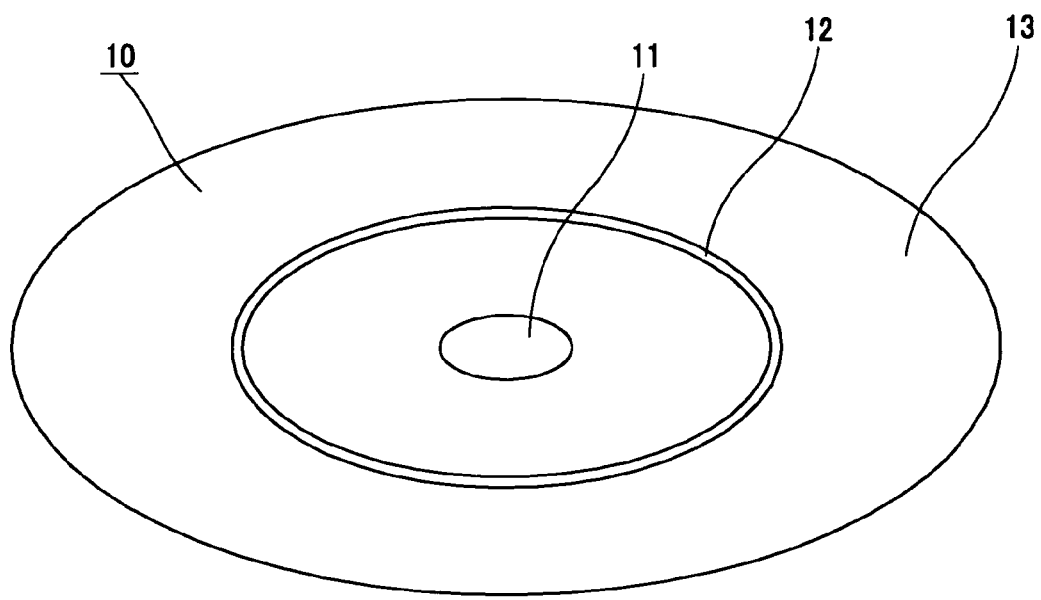
FIG. 2 is a perspective view for illustrating an optical disc employed in the system shown in FIG. 1.

If the optical disc 10, used for the present system 1, is a write-once disc, a layer of an organic dye material, as a recording layer, is provided on one surface of a light transmitting disc substrate, carrying a pattern of lands and grooves, on this surface, whereas, if the optical disc is a rewritable disc, a layer of a phase change material is provided as a recording layer, as shown in FIG. 2. On this recording layer are sequentially formed a reflective layer and a protective layer. A light beam is illuminated from the disc substrate side for recording and/or reproducing information signals.

This optical disc 10 has a center opening 11 around which is formed a management area 12 for recording management data. On the outer rim side of the management area 12 is formed a data recording area 13 in which to record contents data.

Figure 3:
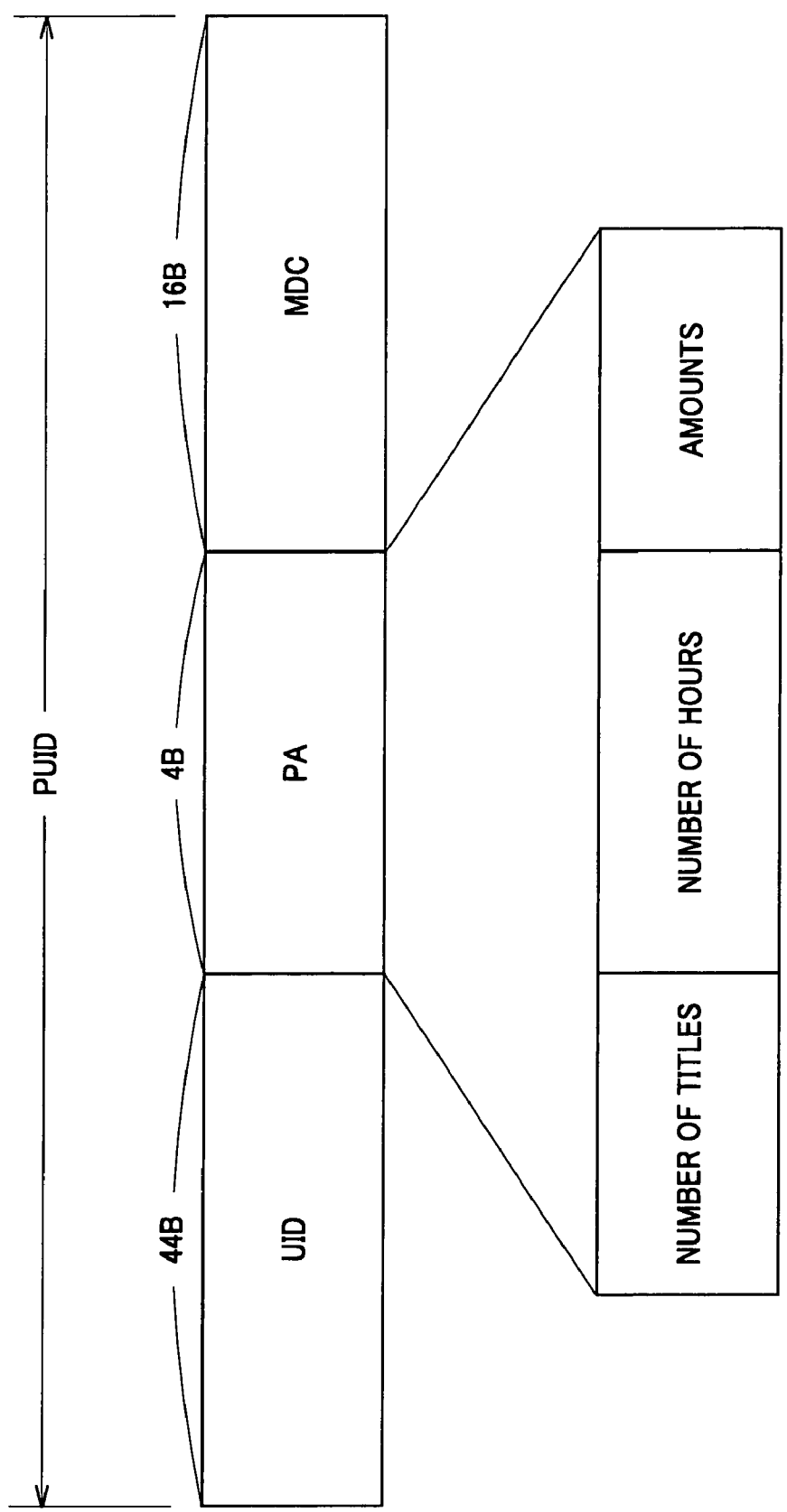
FIG. 3 illustrates PUID data recorded in a management area of the optical disc.

In the management area 12, there is recorded prepaid unique ID data, referred to below as PUID data, as management data for supervising the recording of contents data, as shown in FIG. 3. This PUID data is made up by unique ID data for identifying each distributed optical disc 10, referred to below as UID data, PA (prepaid amount) data, indicating a prepaid amount, for specifying the recordable volume data, a manipulation/modification detection code, referred to below as MDC data, as authenticity data for detecting whether or not the UID data and PA data have been manipulated.

The UID data is a unique identification data, accorded to each of the optical discs 10 distributed, for discriminating the distributed optical disc 10. Specifically, the UID data has 44 bytes, for example, allocated thereto, and is made up by at least one data from among a nation number, a company number, a plant number, a license number and serial number. The PA data has four bytes, for example, allocated thereto, and is made up by at least one data from among a recordable time of the contents data, number of recordable titles, and data on e.g., amounts prepaid at the time of purchasing the optical disc, such as 1000 yen, 2000 yen or 3000 yen, in a data recording area 13 reserved for the cost of the optical disc. Of course, the data forming the PA data may be constituted by one or more of these data.

Figure 4:
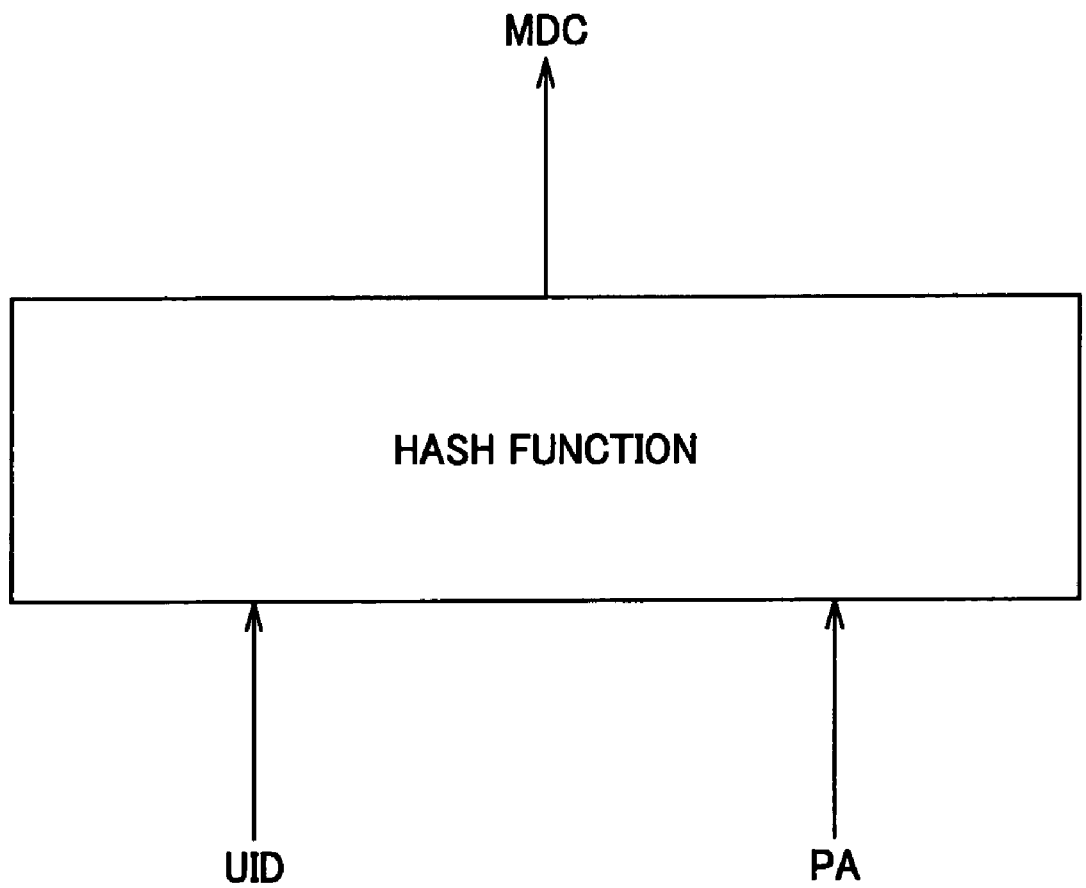
FIG. 4 illustrates PUID data generated by a hash function.

The MDC data is a code of for example 8 or 16 bytes for verifying whether or not the UID data or PA data has been modified, as shown in FIG. 4. It is generated from the UID data and PA data, using a hash function, as a unidirectional function, and is able to detect whether or not the UID data or PA data has been modified by e.g., manipulation. Thus, with the present optical disc 10, the MDC data, pre-recorded in the management area 12, is compared to the MDC data, generated at the time of recording and/or reproduction from the UID data and PA data, using a hash function, when the user downloads desired contents data from the server device 40 using the data recording and/or reproducing apparatus 60 or when the user reproduces contents data downloaded from the server device 40. The contents data may be recorded and/or reproduced only when the two coincide, so that there is no risk of contents data being recorded and/or reproduced by an unauthorized user.

As authenticity data, MAC (Message Authentication Data) may be used in place of the MDC data. Alternatively, CRC (cyclic redundancy check code) may be used. With CRC, it is possible to specify manipulated portions of the UID data or PA data.

The optical disc 10, constructed as described above, is sold in e.g., an audio store with the PUID data recorded in the management area 12 thereof.

Figure 5:
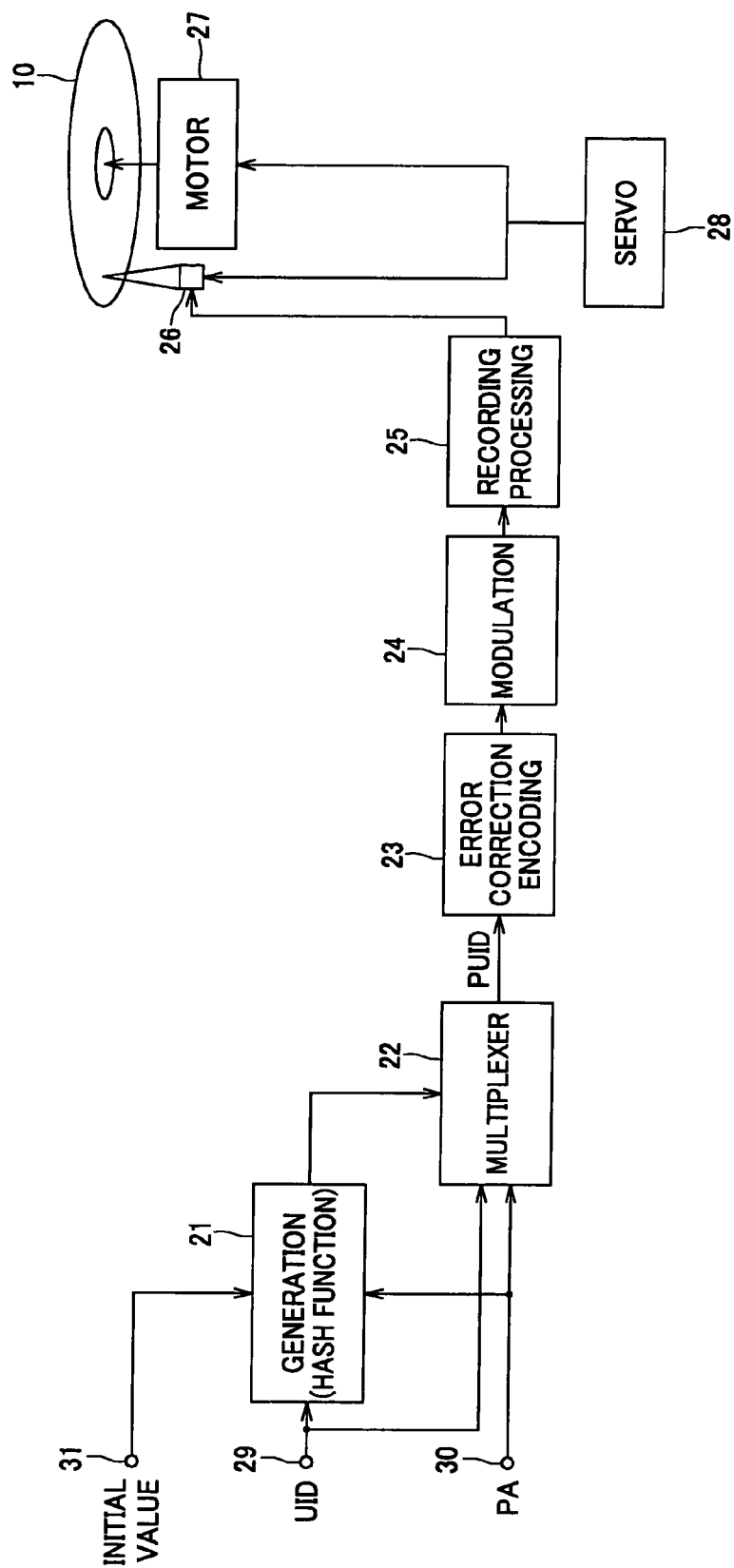
FIG. 5 is a block diagram for illustrating a data recording apparatus for recording PUID data thereon.

Referring to FIG. 5, a data recording apparatus 20, used for recording PUID data on the above-described optical disc 10, is owned by e.g., an audio producing firm, and includes a generating unit 21, a multiplexer 22, an error correction encoding unit 23, a modulating unit 24, a recording processing unit 25, an optical pickup 26, a motor 27, and a servo controlling unit 28. The generating unit 21 is supplied with UID data and PA data to generate PUID data using a hash function. The multiplexer 22 generates PUID data made up by the UID data, PA data and the MDC data. The error correction encoding unit 23 appends error correction codes to the PUID data. The modulating unit 24 modulated data processed with error correction encoding. The recording processing unit 25 executes processing for recording the PUID data in the management area 12 of the optical disc 10. The optical pickup 26 radiates a light beam to the optical disc 10 for recording the PUID data to detect the return light beam. The motor 27 runs the optical disc 10 in rotation at CLV (constant linear velocity) or at CAV (constant angular velocity). The servo controlling unit 28 performs focussing control or tracking control of the optical pickup 26 and rotational control of the motor 27.

The generating unit 21 is supplied with UID data, PA data and with an initial value from a first input terminal 29, a second input terminal 30 and from a third input terminal 31, respectively. Referring to FIG. 4, the generating unit 21 generates MDC data from the UID data and from the PA data, using the hash function, to output the resulting MDC data to the multiplexer 22.

The generating unit 21, generating the MDC data, using the hash function, is explained in detail.

Figure 6:
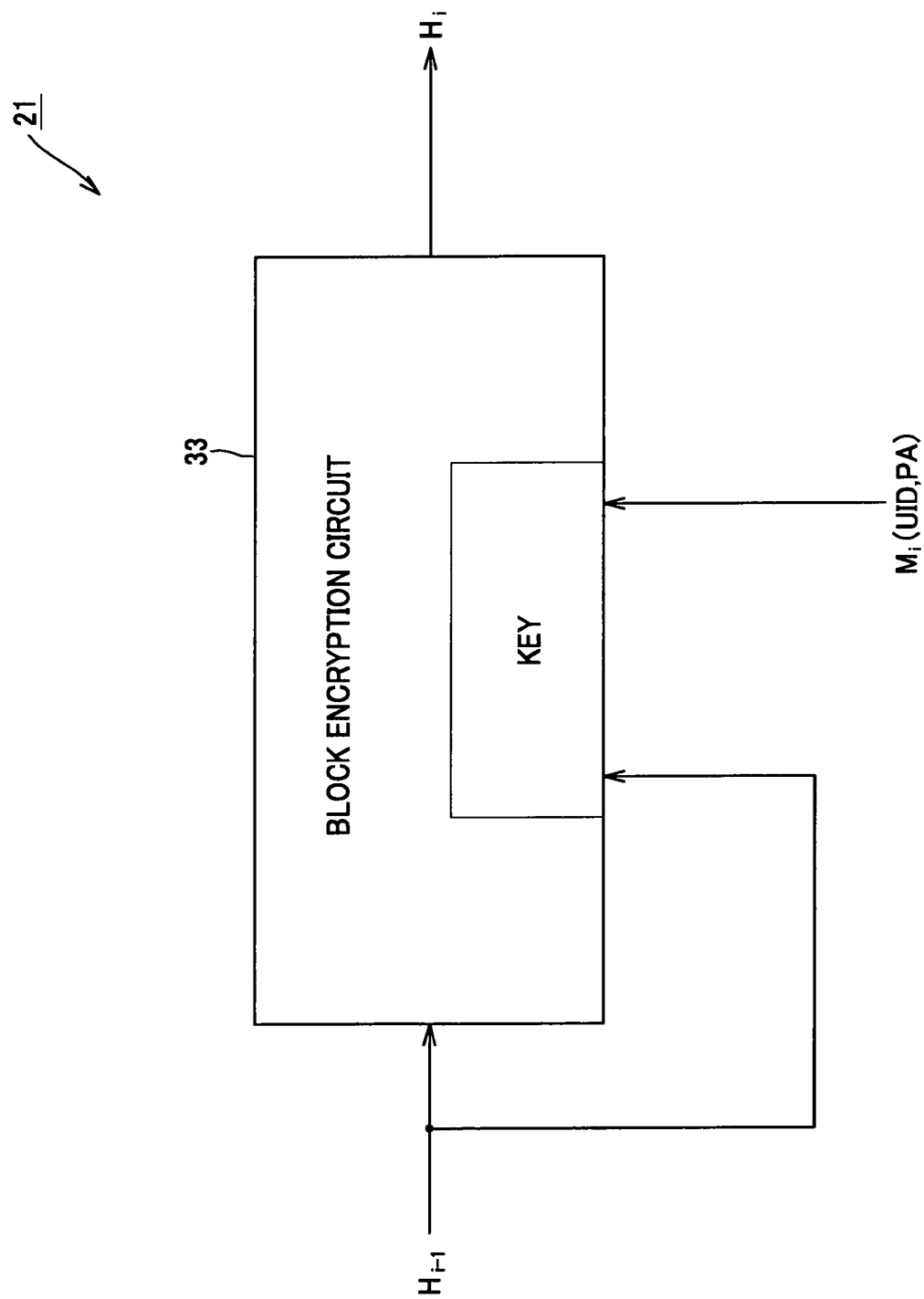
FIG. 6 is a block diagram for illustrating an exemplary structure of a unit for generating MDC data.

If the hash function is e.g., a so-called Modified Davies-Meyer, the generating unit 21 includes a block encrypting circuit 33, for executing the block encryption exhibiting chaining properties, as shown in FIG. 6. This block encrypting circuit 33 exploits e.g., encryption conforming to the data encryption standard, referred to below as DES, and is supplied with the UID data made up by 44 bytes and with PA data made up by 4 bytes, as plaintext data Mi (i=1 to 6 (=(44+4)×8/64)), in terms of a block made up by 64 bits as a unit.

With a value of e.g., 64 bits, generated at random (referred to below as a random initial value $H_0$), as initial encryption key data, the block encrypting circuit 33 encrypts the plaintext data $M_i$, as an initial block, with DES, to output cryptotext data $H_1$. The block encrypting circuit 33 then DES-encrypts the plaintext data $M_2$, as the next block, with the produced cryptotext data $H_1$ as encryption key data to output cryptotext data $H_2$. In similar manner, the block encrypting circuit 33 DES-encrypts the plaintext data $M_i$, with the cryptotext data $H_{i-1}$, obtained by the previous encryption, as encryption key data, to encrypt the plaintext data $M_i$. This sequence of operations is repeated up to plaintext data $M_6$. That is, the generating unit 21 repeatedly executes the calculations according to the following equations:

$$H_0 = I_H(\text{random initial value})$$

$$H_i = E_{Hi-1}, M_i(H_{i-1})$$

where $E_{Hi-1}$ denotes encryption employing the cryptotext data $H_{i-1}$ as encryption key data. The cryptotext data $H_6$, ultimately obtained, is sent to the multiplexer 22 as MDC data. In decryption, the processing similar to that described above is performed repeatedly on the UID data and the PA data, recorded in the management area 12 of the optical disc 10, using the random initial value $H_0$ as encryption key data. The so produced cryptotext data is compared to the cryptotext data $H_6$, recorded as the MDC data on the optical disc 10, to check to see whether the HID data and/or the PA data have been manipulated.

Figure 7:
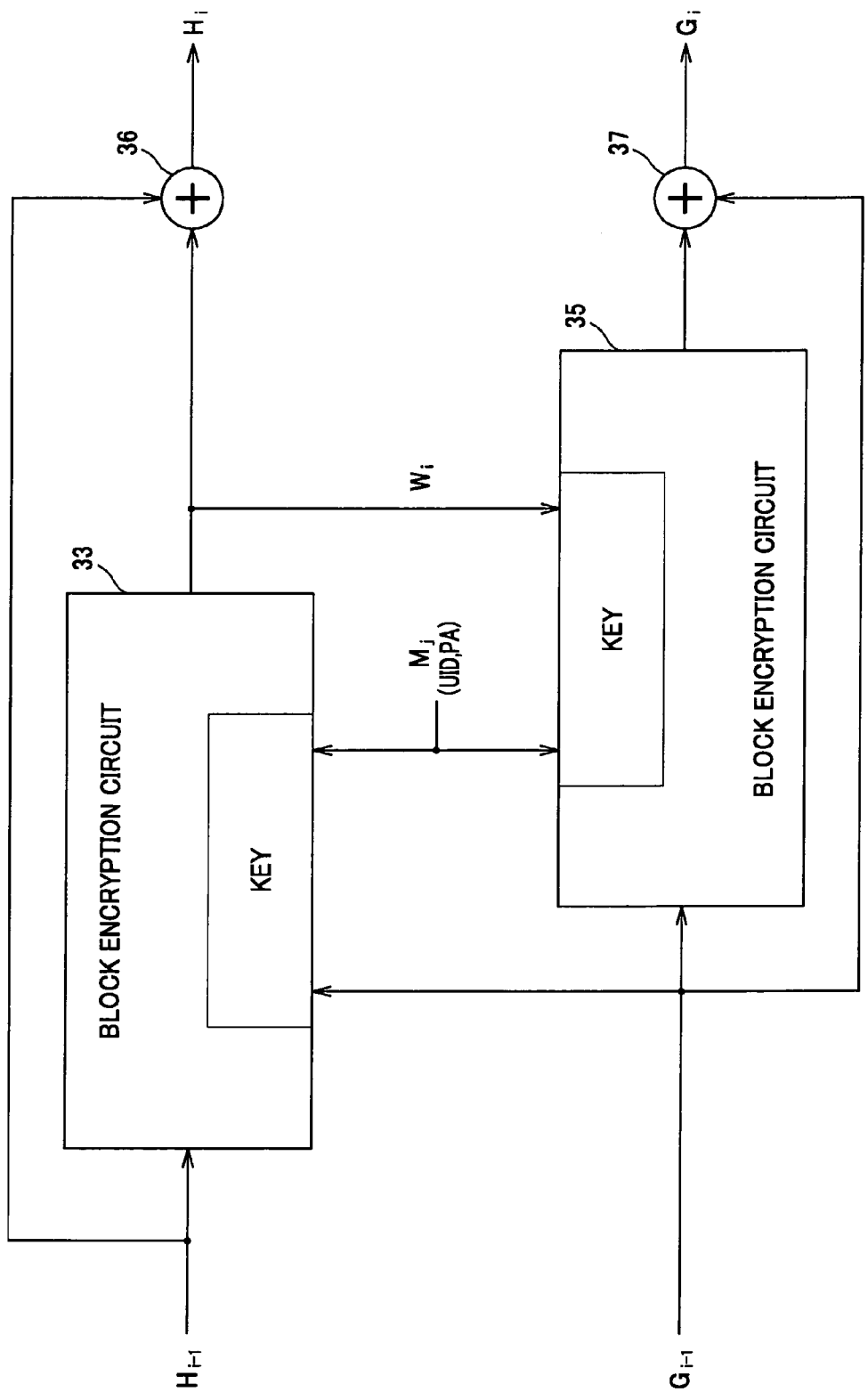
FIG. 7 is a block diagram for illustrating another exemplary structure of a generating unit for generating MDC data.

The generating unit 21 may be constructed as shown in FIG. 7. In the present embodiment, the hash function is, for example, a so-called Tandem Davies-Meyer, with the generating unit 21 including two block encryption circuits 34, 35, performing block encryption exhibiting chaining properties, and two exclusive-OR circuits 36, 37, adapted for finding an Ex-OR of the encryption key data and the cryptotext data, as shown in FIG. 7. These block encryption circuits 34, 35 use DES encryption, for example, and are supplied with 44 bytes of the UID data and 4 bytes of the PA data, on the block basis, with e.g., 64 bits as one block, in the form of plaintext data $M_i$ (i=1 to 6 (=(44+4)×8/64)).

The block encryption circuit 34 DES-encrypts the plaintext data Mi, as an initial block, with e.g., 64 bits of the random initial value $G_0$ generated at random, as an initial encryption key data, to output cryptotext data $W_i$. The exclusive-OR circuit 36 finds Ex-OR of a random initial value $H_0$, different than the random initial value $G_0$, and the cryptotext data $W_i$, to output the result as cryptotext data $H_1$.

On the other hand, the block encryption circuit 35 DES-encrypts the cryptotext data $W_i$, output from the block encryption circuit 34, with the plaintext data Mi as initial encryption key data, whilst the exclusive-OR circuit 37 finds the Ex-OR of the random initial value $G_0$ and the output of the block encryption circuit 35 to output the result as cryptotext data $G_1$.

The block encryption circuit 34 DES-encrypts the plaintext data $M_2$, as the next block, with the cryptotext data $G_1$, output from the exclusive-OR circuit 37, as encryption key data, to output cryptotext data $W_2$. The exclusive-OR circuit 36 finds an Ex-OR of the cryptotext data $H_1$, output from the exclusive-OR circuit 36, and the cryptotext data $W_2$, to output the result as cryptotext data $H_2$. The block encryption circuit 35 DES-encrypts the cryptotext data $W_2$, output from the block encryption circuit 34, with the plaintext data $M_2$ as encryption key data, whilst the exclusive-OR circuit 37 finds an Ex-OR of the cryptotext data $G_1$ and an output of the block encryption circuit 35 to output the result as cryptotext data $G_2$.

In similar manner, the block encryption circuit 34 DES-encrypts the plaintext data $M_i$, with cryptotext data Gi−1, obtained by the previous encryption, as encryption key data, whilst the exclusive-OR circuit 36 finds the Ex-OR of the cryptotext data $H_{i-1}$ and the cryptotext data $W_i$ to output the result as cryptotext data $H_i$. The block encryption circuit 35 DES-encrypts the cryptotext data $W_i$, with the plaintext data $M_i$ as encryption key data, whilst the exclusive-OR circuit 37 finds the Ex-OR of the cryptotext data $G_{i-1}$ and the output of the block encryption circuit 35 to output the result as cryptotext data $G_i$. This sequence of operations is reiterated up to the plaintext data $M_6$. That is, the generating unit 21 reiterates the calculations of the following equations:

$$G_0 = I_G \text{(random initial value)}$$

$$H_0 = I_H \text{(another random initial value)}$$

$$W_i = E_{Gi-1,Mi}(H_{i-1})$$

$$G_i = G_{i-1} \oplus E_{Mi,wi}(G_{i-1})$$

$$H_i = W_i \oplus H_{i-1}$$

where $E_{Gi-1}$ depicts encryption with the cryptotext data $G_{i-1}$ as encryption key data and $E_{Mi}$ depicts encryption with the plaintext data $M_i$ as encryption key data. The generating unit 21 generates, from the ultimately obtained cryptotext data $G_6$ and $H_6$, a differential $G_6-H_6$, which then is output to the multiplexer 22.

Figure 8:
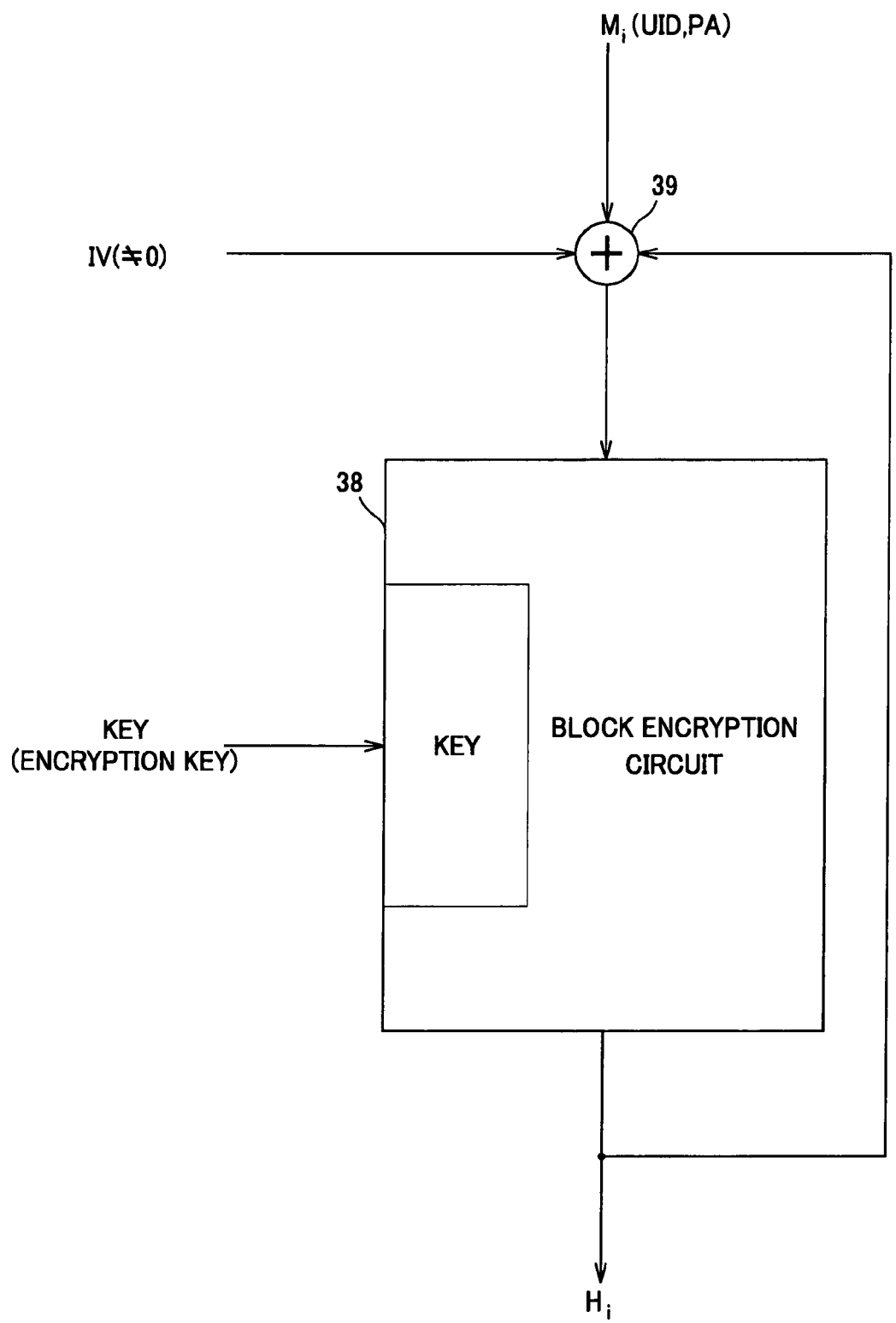
FIG. 8 is a block diagram for illustrating still another exemplary structure of a unit for generating MDC data.

In an alternative structure of the generating unit 21, the hash function is e.g., what is called the CBC-MAC (Cipher-Block-Chaining-Message Authentication Code). The generating unit 21 includes a block encrypting circuit 38, for performing block encryption exhibiting chaining properties, and an exclusive-OR circuit 39 for finding the Ex-OR of the cryptotext data and the plaintext data, as shown in FIG. 8. This block encrypting circuit 38 exploits e.g., encryption, and is supplied with the UID data made up by 44 bytes and with PA data made up by 4 bytes, on the block basis, in the form of plaintext data $M_i$ (i=1 to 6 (=(44+4)×8/64)), in terms of a block made up by e.g., 64 bits as one block.

The exclusive-OR circuit 39 is supplied with a random initial value IV (≠0), as an initial value, and finds an Ex-OR thereof with the plaintext data $M_i$ to output the result to the block encryption circuit 38. The block encryption circuit 38 DES-encrypts an initial block, using an output from the exclusive-OR circuit 39 as secret key, to output cryptotext data Hi.

The exclusive-OR circuit 39 then finds an Ex-OR of the so produced cryptotext data $H_i$ and plaintext data $M_2$, as the next block, to output the result to the block encryption circuit 38. This block encryption circuit 38 DES-encrypts the output, using a secret key, to output cryptotext data $H_2$. In similar manner, the generating unit 21 DES-encrypts the plaintext data $M_i$, using the cryptotext data $H_{i-1}$, obtained by the previous encryption, as encryption key data. This sequence of operations is repeated up to the plaintext data $M_6$. The cryptotext data $H_6$, thus obtained, is output as MAC data to the multiplexer 22.

In the above-described embodiment, the block size for block encryption, for example, is set to 64 bits. The present invention is not limited to this specified embodiment, such that the block size may be different than 64 bits. With the block size of, for example, 128 bits, the MDC data is the cryptotext data $H_3$, obtained on three encryption operations, or a differential of the cryptotext data $G_3-H_3$.

Referring to FIG. 5, the multiplexer 22 is supplied with the UID data, PA data and with the MDC data, from the first input terminal 29, a second input terminal 30 and from the generating unit 21, respectively. The multiplexer 22 synthesizes the UID data, PA data and the MDC data together to generate the PUID data to be recorded on the optical disc 10 to output the PUID data to the error correction encoding unit 23.

The error correction encoding unit 23 applies encoding, by a combination of cross-interleaving and order-four Reed Solomon codes, to samples of the digital data, using an algorithm of cross-interleave Reed-Solomon Code (CIRC), to output the result to the modulating unit 24, as shown in FIG. 5. The modulating unit 24 modulates the encoded output data from the error correction encoding unit 23, in accordance with an EFM (eight-to-fourteen modulation), to output the modulated result to the recording processing unit 25. This recording processing unit 25 performs preset recording processing on the modulated data to output the result to the optical pickup 26.

The optical pickup 26 includes a semiconductor laser device, for radiating laser light as a laser light beam, an objective lens for condensing the light beam, radiated from the semiconductor laser device, and a photodetector for detecting the return light beam reflected back from the optical disc 10. The optical pickup 26 illuminates the light beam, radiated from the semiconductor laser device, to the signal recording surface of the optical disc 10, to record data, such as PUID data, on the recording surface, while detecting the return light beam, reflected back from the signal recording surface of the optical disc 10, by the photodetector. The objective lens is held by an objective lens driving mechanism, such as electromagnetic actuator, and is moved along the focussing direction, parallel to the optical axis of the objective lens, based on focussing servo signals, while being moved along the tracking direction perpendicular to the optical axis of the objective lens, based on the tracking servo signals.

The servo controlling unit 28 is supplied, from an error signal generating unit, not shown, with focussing error signals and with tracking error signals, generated from output signals of a photodetector forming the optical pickup 26. For example, the focussing error signals are generated by the so-called astigmatic method, while the tracking error signals are generated by a so-called three-beam method or a push-pull method. The servo controlling unit 28 generates focussing servo signals, based on the supplied focussing error signals, so that the focussing error signals will be reduced to zero. The servo controlling unit 28 also generates tracking servo signals, based on the supplied tracking error signals, so that the tracking error signals will be reduced to zero. The servo controlling unit 28 outputs the focussing servo signals and tracking servo signals to a driving circuit, not shown, of the objective lens driving mechanism forming the optical pickup 26. This driving circuit actuates the objective lens driving mechanism, based on the focussing servo signals, to move the objective lens along the focussing direction parallel to the optical axis of the objective lens. The driving circuit also actuates the objective lens driving mechanism, based on the tracking servo signals, to move the objective lens along the tracking direction perpendicular to the optical axis of the objective lens.

The sequence of operations of the data recording apparatus 20, adapted for recording the PUID data in the management area 12 of the optical disc 10, is hereinafter explained. First, the UID data of the optical disc 10, on which to record the PUID data, is input to the first input terminal 29. The PA data, indicating the volume of the contents data recordable on the optical disc 10, on which is recorded the PUID data, is input to the first input terminal 30. The generating unit 21 generates the MDC data, using the hash function, from the UID data input from the first input terminal 29 and from the PA data input from the second input terminal 30, to output the so generated data to the multiplexer 22. The multiplexer 22 synthesizes the UID data, PA data and the MDC data, supplied from the first input terminal 29, to generate PUID data to be recorded in the management area 12, to output the so generated PUID data to the error correction encoding unit 23. This error correction encoding unit 23 appends error correction codes to the PUID data. The modulating unit 24 then modulates the PUID data added by the error correction code. The recording processing unit 25 then performs recording processing to output the resulting data to the optical pickup 26. The optical pickup 26 illuminates a light beam on the management area 12 of the rotating optical disc, loaded on the disc table, forming the disc rotating driving mechanism, to record the PUID data in the management area 12. The servo controlling unit 28 exercises focussing servo control and tracking servo control of the objective lens in order to record the PUID data reliably in the management area 12.

It is noted that the present system 1 is made up by a server device 40, owned by a provider, superintending the present services, and a data recording and/or reproducing device 60, owned by e.g. a user. These devices are interconnected over a network, such as ISDN (Integrated Services Digital Network), CATV (Cable television) network, optical cable network or a satellite network, and are capable of exchanging data in accordance with a transmission protocol, such as TCP/IP (transmission control protocol/Internet protocol) or FTP (file transfer protocol).

Figure 9:
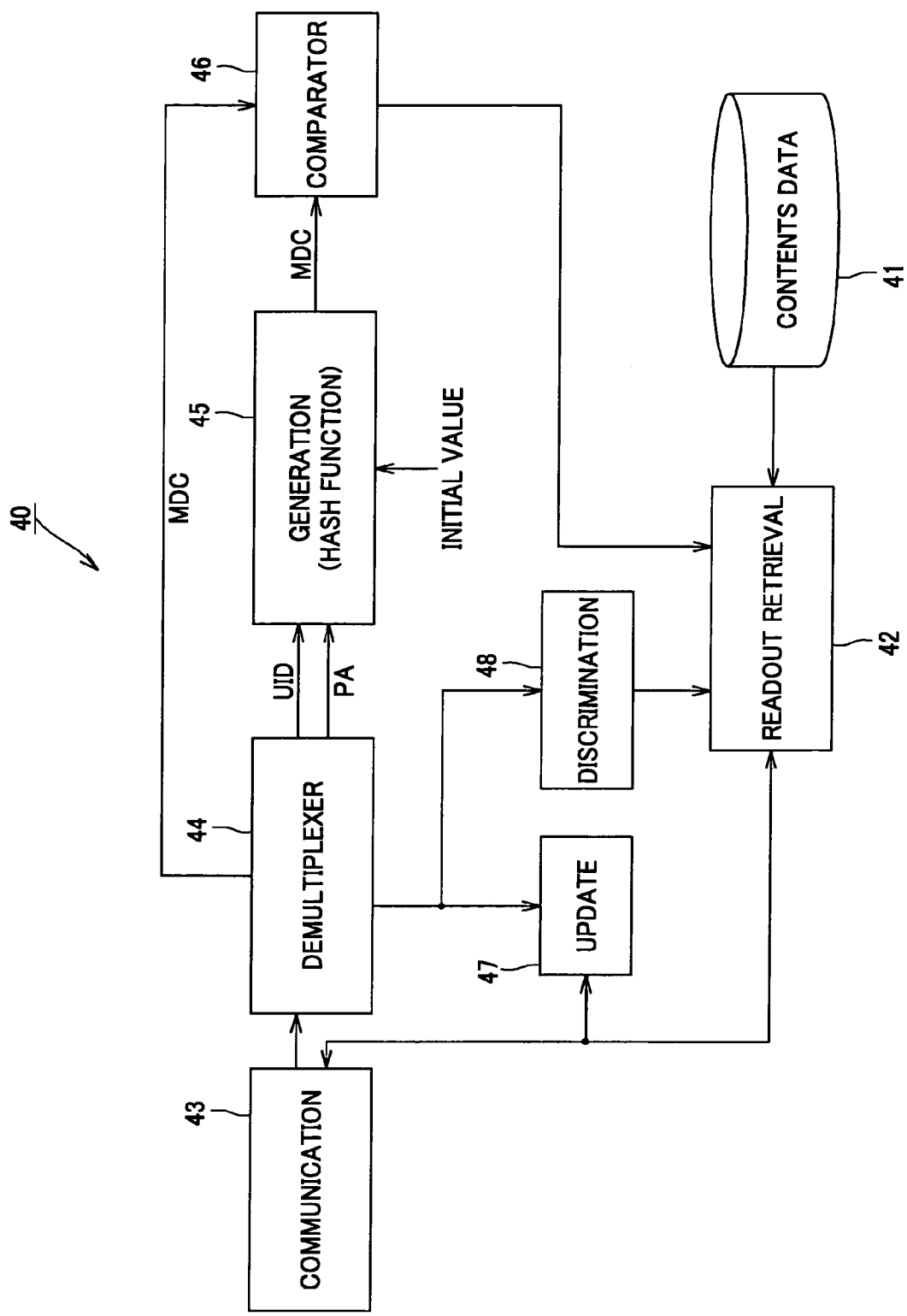
FIG. 9 is a block diagram for illustrating a server device.

Referring to FIG. 9, the server device 40, owned by a provider, superintending the present services, includes, for example, a storage unit 41, in which is stored contents data, downloaded from the recording and/or reproducing device 60, owned by the user, a readout detection unit 42, for reading out preset contents, from the storage unit 41, a communication unit 43 for communication with the recording and/or reproducing device 60, owned by the user, a demultiplexer 44 for separating the PUID data, transmitted from the recording and/or reproducing device 60, owned by the user, a generator 45 for generating the MDC data, from the UID data and the PA data, and a comparator 46 for comparing the MDC data extracted by the demultiplexer 44 from the PUID data to the MDC data generated by the generator 45. The server device 40 also includes an update unit 47 for updating the PUID data on downloading the contents data, and a discrimination unit 48 for verifying whether or not the contents data specified by the user can be downloaded with the current PA data.

The storage unit 41 is made up by for example a large capacity hard disc drive device, and has stored therein contents data exemplified by music number data or motion picture data. It is noted that the contents data are recorded encoded by compression encoding methods, exemplified by ATRAC 3 (Adaptive Transform Acoustic Coding 3: trademark). MPEG-2AAC (Moving Picture Expert Group 1 Advanced Audio Coding: trademark), MP3 (MPEG-1 Audio Layer 3, trademark), TwinVQ (Transform-Domain Weighted Interleave Vector Quantization, trademark), MS Audio (WMA: Windows MediaAudio: trademark) and Ogg Vorbis (trademark). The readout detection unit 42 retrieves contents data, which is in keeping with selection data for selecting the contents data, transmitted from the recording and/or reproducing device 60, owned by the user, and reads out the retrieved data from the storage unit 41.

The communication unit 43 receives data, such as download request from the user's recording and/or reproducing device 60, selection data for the contents data, transmitted from the recording and/or reproducing device 60, or the PUID data, recorded on the optical disc 10, loaded on the user's recording and/or reproducing device 60. The communication unit 43 sends data, such as contents data, which is in keeping with the selection data, or updated UID data, to the recording and/or reproducing device 60.

The demultiplexer 44 demultiplexes the PUID data, input from the communication unit 43, into the UID data, PA data and MDC data, and routes the UID data and the PA data to the generating unit 45 and to the update unit 47. The demultiplexer 44 also routes the PA data to the discrimination unit 48 for updating the recordable data volume. Moreover, the demultiplexer 44 outputs the MDC data to the comparator 46.

The generating unit 45 generates the MDC data, from the UID data and the PA data, input from the using the demultiplexer 44, using the hash function, to output the so generated MDC data to the comparator 46. Meanwhile, the generating unit 45 is similar in structure to the configuration shown in FIGS. 6 to 8 and hence is not explained specifically.

The comparator 46 compares the MDC data, extracted from the demultiplexer 44, to the MDC data, generated by the generating unit 45, to make a check as to possible coincidence between these MDC data. That is, if the UID data or the PA data has been manipulated, the MDC data generated by the generating unit 45 differs from the MDC data extracted by the demultiplexer 44. Thus, the comparator 46 compares the MDC data, extracted by the demultiplexer 44, to the MDC data, generated by the generating unit 45 and, in case of coincidence of these two MDC data, determines that the access is that from an authorized user, to output a readout permission signal to the readout detection unit 42. In case of non-coincidence of the extracted MDC data with the generated MDC data, the comparator determines the access to be that from an unauthorized user to output a readout inhibit signal to the readout detection unit 42.

Figure 10:
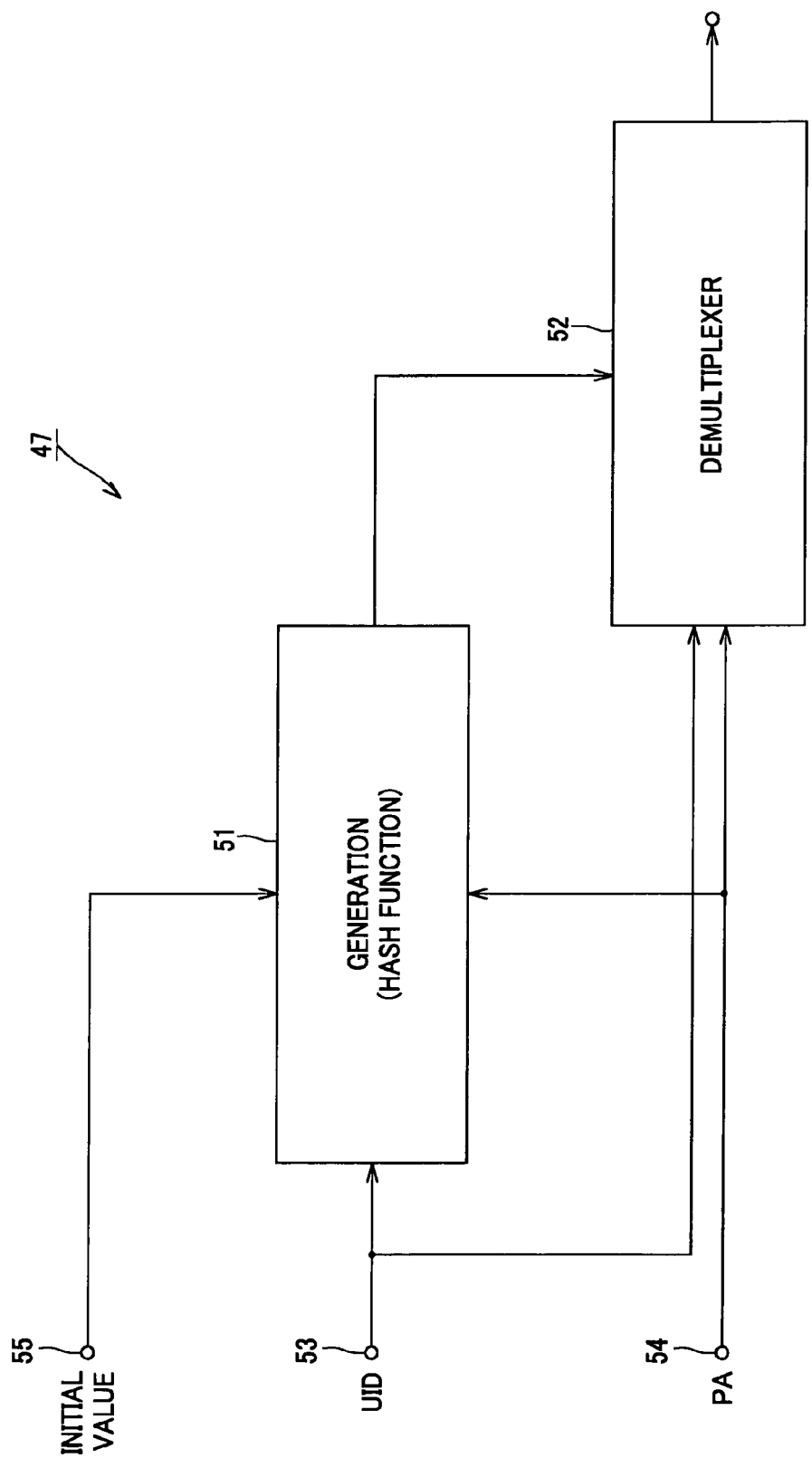
FIG. 10 is a block diagram for illustrating a unit for updating MDC data.

When transmitting contents data, which is in keeping with the selection data, to the data recording and/or reproducing device, the update unit 47 updates the PA data and, using the hash function, generates the PUID data, to be transmitted to the data recording and/or reproducing device 60, from the updated PA data and the UID data. Specifically, the update unit 47 includes a generating unit 51, supplied with the UID data and the PA data to generate the MDC data with the aid of the hash function, and a multiplexer 52 for generating the PUID data made up by the UID data, PA data and the MDC data, as shown in FIG. 10. The generating unit 51 is supplied with the UID data, updated PA data and with an initial value from the first input terminal 53, a second input terminal 54 and from a third input terminal 55, respectively. The generating unit 51 generates MDC data, using the hash function, from the UID data and the updated PA data, to output the so generated MDC data to the multiplexer 52. That is, the generating unit 51 is supplied with a value equal to the current recordable value less a value corresponding to the number transmitted to the data recording and/or reproducing device 60, as PA data, and generates MDC data from the PA data and the UID data. Meanwhile, the configuration of the generating unit 51 is the same as that of FIGS. 6 to 8 and hence is not explained in detail. The multiplexer 52 is supplied with the UID data, updated PA data and with the updated MDC data, from the first input terminal 53, second input terminal 54 and from the generating unit 51, respectively. The multiplexer 52 synthesizes the UID data, PA data and the MDC data to generate updated PUID data to be recorded on the optical disc 10, as shown in FIG. 3. The update unit 47, shown in FIG. 9, constructed as described above, performs error correction and modulation processing on the PUID data to output the resulting data to the communication unit 43.

Referring to FIG. 9, the discrimination unit 48 verifies whether or not the contents data specified by the user can be downloaded with the current PA data. If the current PA data does not meet the condition for downloading the desired contents data, the discrimination unit 48 outputs a readout inhibit signal, inhibiting the readout of the contents data, to the readout detection unit 42, whereas, if the current PA data is sufficient to download the desired contents data, the discrimination unit 48 outputs a readout permission signal to the readout detection unit 42. The 'current PA data does not meet the condition for downloading the desired contents data' if for example the amount for downloading the contents data cannot be collected, or if the recordable capacity falls short.

The operation of the server device 40, constructed as described above, is now explained. If the PUID data is transmitted, along with the selection data for the contents data, from the user's data recording and/or reproducing device 60, the communication unit 43 outputs the PUID data to the demultiplexer 44, while outputting the selection data to the readout detection unit 42. The demultiplexer 44 separates the PUID data, input from the communication unit 43, into the UID data, PA data and the MDC data, and outputs the MDC data to the comparator 46, while outputting the UID data and the PA data to the generating unit 45 and to the update unit 47. The demultiplexer 44 outputs the PA data to the discrimination unit 48 for determining the recordable volume. The generating unit 45 generates MDC data, from the UID data and the PA data, supplied from the demultiplexer 44, using the hash function, to output the MDC data to the comparator 46. Before reading out the contents data corresponding to the selection data, the comparator 46 has to verify whether or not the access is from the data recording and/or reproducing device 60 of a user owning the authentic optical disc 10. To this end, the comparator 46 compares the MDC data, supplied from the demultiplexer 44, to that supplied from the generating unit 45, to check to see if the two coincide with each other. The reason is that, if the PA data indicating the possible recording volume has been changed, the MDC data, output by the generating unit 45, differs from the MDC data extracted by the demultiplexer 44. The comparator 46 compares the MDC data generated in the generating unit 45 to the MDC data extracted by the demultiplexer 44. In case of coincidence of the two data, the comparator 46 is able to determine that the access is from the data recording and/or reproducing device 60 of an authorized user and, if otherwise, the comparator 46 is able to determine that the access is from the data recording and/or reproducing device 60 of an unauthorized user. In case of coincidence of the extracted MDC data to the generated MDC data, the comparator 46 outputs a contents data readout permission signal to the readout detection unit 42. In case of non-coincidence of the extracted MDC data to the generated MDC, the comparator 46 outputs a contents data readout inhibit signal to the readout detection unit 42. The discrimination unit 48 verifies whether or not the contents data specified by the user can be downloaded with the current PA data. If the results of discrimination indicate that the downloading is possible, the discrimination unit 48 outputs a readout permission signal to the readout detection unit 42, whereas, if the PA data is not up to the requirements, for example, if the PA data is in shortage, the discrimination unit 48 outputs a readout inhibit signal to the readout detection unit 42.

When the readout detection unit 42 is supplied with the reproduction permission signal from the comparator 46 and from the discrimination unit 48, the readout detection unit 42 retrieves and extracts the contents data corresponding to the selection data input from the communication unit 43 from the plural contents data stored in the storage unit 41, to output the retrieved and extracted contents data to the communication unit 43. Simultaneously, the update unit 47 updates the PA data, responsive to e.g., the number of downloaded items of the contents data and, using the updated PA data, UID data and the MDC data, generates the PUID data to be transmitted to the data recording and/or reproducing device 60, and outputs the so generated PUID data to the communication unit 43. This communication unit 43 sends the updated PUID data, along with the contents data corresponding to the selection data, to the user's data recording and/or reproducing device 60. Thus, the server device 40 is able to prohibit contents data from being transmitted to the data recording and/or reproducing device 60 of an unauthorized user by verifying, with the aid of the MDC data of the PUID data transmitted from the user's data recording and/or reproducing device 60, whether or not an access is from an authorized user. Moreover, the server device 40 is able to prohibit manipulation of the PUID data by the user, by server device 40 updating the PUID data and by the data recording and/or reproducing device 60 not updating the PUID data.

Figure 11:
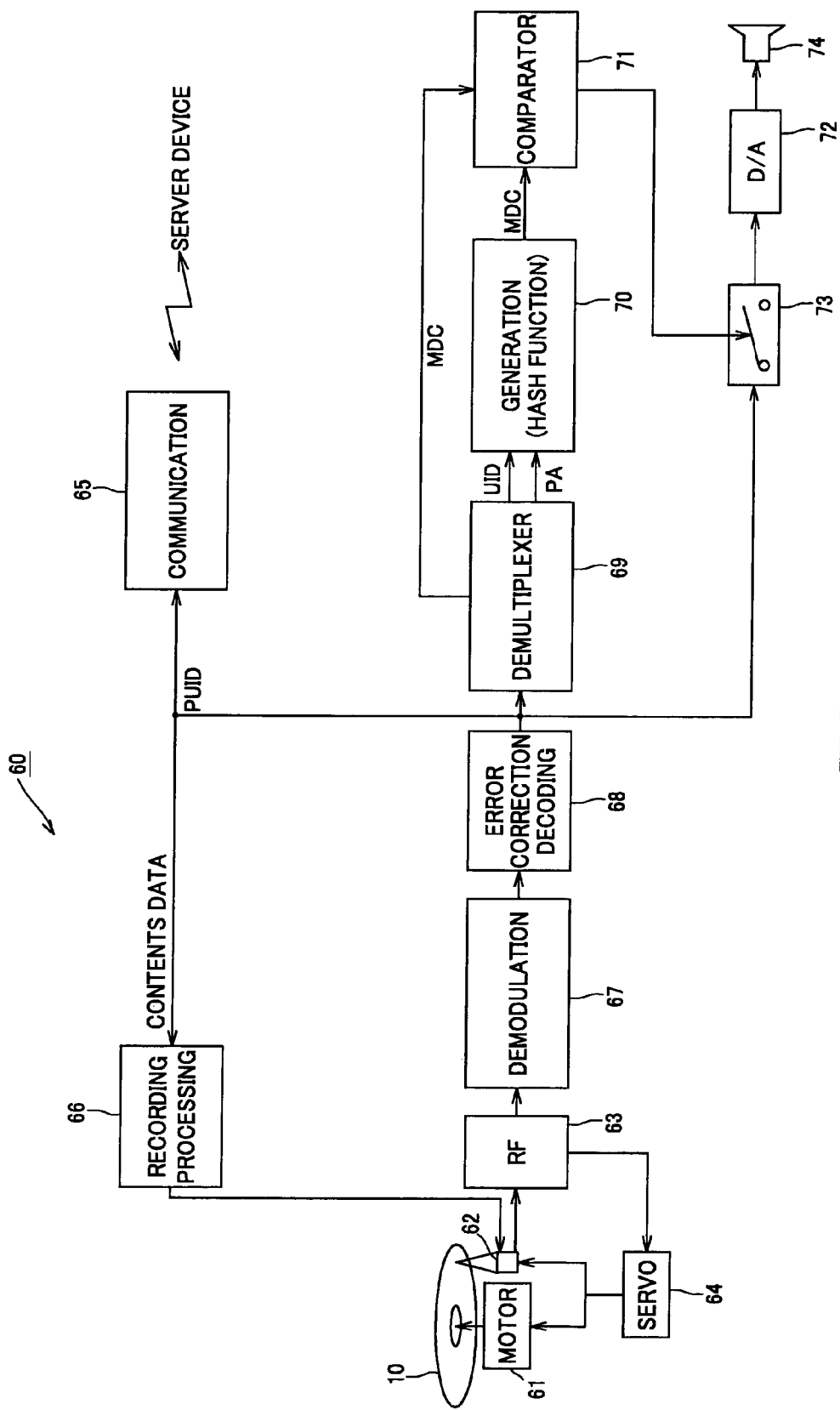
FIG. 11 is a block diagram for illustrating a data recording and/or reproducing apparatus.

Referring to FIG. 11, the data recording and/or reproducing device 60, accessing the server device 40, is now explained. This data recording and/or reproducing device 60 includes a motor 61 for rotationally driving the optical disc 10, an optical pickup 62 for recording and/or reproducing data by illuminating a light beam on the optical disc 10, an RF amplifier 63 for amplifying an output from the optical pickup 62, a servo controlling unit 64 for servo controlling the motor 61 and the optical pickup 62, a communication unit 65 for receiving PUID data or contents data, transmitted from the server device 40, a recording processor 66 for performing recording processing on the data received by the communication unit 65, a demodulating unit 67 for demodulating an output from the RF amplifier 63, an error correction decoding unit 68 for performing error correction processing on the data demodulated by the demodulating unit 67, a demultiplexer 69 for separating the PUID data into the UID data, PA data and the MDC data, a generating unit 70 for generating MDC data from the UID data and the PA data, a comparator 71 for comparing the MDC data extracted by the demultiplexer 69 from the PUID data, to the MDC data generated by the generating unit 70, and a D/A converter 72 for converting the contents data from digital signals to analog signals. The data recording and/or reproducing device 60 also includes a switching unit 73 for limiting the outputting to the D/A converter, and an output unit 74, such as a loudspeaker or a monitor, for outputting contents data.

The distal end of a rotational shaft of the motor 61 carries a disc table, adapted for loading the optical disc 10 thereon, so that the optical disc 10 loaded on the disc table is run in rotation in CLV or CAV, under control by the servo controlling unit 64.

The optical pickup 62 includes a semiconductor laser device, radiating the laser light as a light beam, not shown, an objective lens for condensing the light beam, radiated from the semiconductor laser device, on the recording layer of the optical disc 10, and a photodetector for detecting the return light beam reflected back from the optical disc 10. When recording the PUID data or the downloaded contents data, the optical pickup 62 illuminates the light beam, radiated from the semiconductor laser device, on the recording layer of the optical disc 10, to record data, such as PUID data, on the recording layer. During reproduction, the optical pickup 62 illuminates the light beam to a preset area to detect the return light beam, reflected back from the recording layer, by a photodetector, by way of photoelectrically transducing the light beam. The objective lens, held by an objective lens driving mechanism, such as electromagnetic actuator, is driven along the focussing direction parallel to the optical axis of the objective lens, based on the focussing servo signal, while being driven along the tracking direction, perpendicular to the optical axis of the objective lens, based on the tracking servo signals. The optical pickup 62 scans the optical disc 10 by being moved along the radius of the optical disc 10, by a feed mechanism, not shown.

Based on an output signal from a photodetector, forming the optical pickup 62, the RF amplifier 63 generates RF signals, focussing error signals and tracking error signals. The focussing error signals are generated by a so-called astigmatic method, whilst the tracking error signals are generated by a so-called three-beam method or a so-called push-pull method. The RF amplifier 63 outputs the RF signals to the demodulating unit 67, while outputting the focussing error signals and the tracking error signals to the servo controlling unit 64.

The servo controlling unit 64 generates servo signals for reproducing the optical disc 10. Specifically, the servo controlling unit 64 generates focussing servo signals, based on the focussing error signals, supplied from the RF amplifier 63, so that the focussing error signals will be equal to zero, while generating tracking servo signals, based on the tracking error signals, supplied from the RF amplifier 63, so that the tracking error signals will be equal to zero. The servo controlling unit 64 outputs the focussing servo signals and tracking servo signals to a driving circuit, not shown, of the objective lens driving mechanism, forming the optical pickup 62. This driving circuit actuates the objective lens driving mechanism, based on the focussing servo signals, to actuate the objective lens along the focussing direction parallel to the optical axis of the objective lens, while actuating the objective lens driving mechanism, based on the tracking servo signals, to actuate the objective lens along the tracking direction perpendicular to the optical axis of the objective lens. The servo controlling unit 64 actuates the motor 61 for rotationally driving the optical disc 10 in CLV or CAV.

When downloading desired contents data, the communication unit 65 transmits the PUID data, read out from the loaded optical disc 10, while transmitting the selection data of the contents data he/she selected, to the server device 40. The communication unit 65 is responsive to the contents data download request to receive the contents data transmitted from the server device 40, and the PUID data, updated by the server device 40.

The recording processor 66 applies signal processing for recording, to the contents data and the PUID data, received by the communication unit 65, to output the so processing data to the optical pickup 62. The PUID data, updated by the server device 40, is recorded in the management area 12 of the optical disc 10, by the light beam radiated by the optical pickup 62, while the downloaded contents data is recorded in the data recording area 13.

The demodulating unit 67 EFM-demodulates the RF signals, supplied from the RF amplifier 63, and outputs the output data to the error correction decoding unit 68. The error correction decoding unit 68 executes error detection and error correction, based on the error correction codes, such as CIRC. When transmitting the PUID data to the server device 40, the error correction decoding unit 68 outputs the PUID data to the communication unit 65 and, when reproducing the contents data, the error correction decoding unit 68 outputs the PUID data to the demultiplexer 69. The error correction decoding unit 68 outputs the contents data to the switching unit 73.

When reproducing the contents data, the demultiplexer 69 is supplied with the PUID data prior to reproduction of the contents data. The demultiplexer 69 separates the PUID data, input from the error correction decoding unit 68, into UID data, PA data and MDC data. The demultiplexer 69 outputs the UID data and the PA data to the generating unit 70, while outputting the MDC data to the comparator 71.

The generating unit 70 generates MDC data, from the UID data and the PA data, input from the demultiplexer 69, using the hash function, to output the so generated MDC data to the comparator 71. Meanwhile, the generating unit 70 is similar in structure to that shown in FIGS. 6 to 8 and hence is not explained specifically.

The comparator 71 compares the MDC data, extracted by the demultiplexer 69, to the MDC data, generated by the generating unit 70, to determine whether or not the two MDC data are coincident with each other. That is, if the UID data or the PA data have been manipulated, the MDC data generated by the generating unit 70 differs from the MDC data extracted by the demultiplexer 69. Thus, the comparator 71 compares the MDC data extracted by the demultiplexer 69, to the MDC data generated by the generating unit 70 and, in case of coincidence of these two MDC data, determines that the access is that from an authorized user, to turn on the switching unit 73. In case of coincidence of the two MDC data, the comparator turns off the switching unit 73.

The D/A converter 72 converts the input contents data, that is digital data, into analog signals, and outputs the result to the output unit 74 connected to the loudspeaker, earphone, headphone or to the monitor.

If it is determined by the comparator 71 that the MDC data extracted by the demultiplexer 69 is coincident with the MDC data generated by the generating unit 70, the switching unit 73 is turned on by the comparator 71 to interconnect the error correction decoding unit 68 and the D/A converter 72.

If it is determined that the extracted MDC data is not coincident with the generated MDC data, the switching unit 73 is turned off by the comparator 71 to disconnect the error correction decoding unit 68 and the D/A converter 72.

The operation of the data recording and/or reproducing device 60, constructed as described above, is hereinafter explained. First, in downloading the contents data, the optical pickup 62 accesses the management area 12 of the optical disc 10, being run in rotation by the motor 61, to read out the PUID data recorded in the management area 12. The RF amplifier 63 generates RF signals from an output signal of the optical pickup 62, to output the so generated RF signals to the demodulating unit 67. The demodulating unit 67 demodulates data to output the demodulated data to the error correction decoding unit 68. The error correction decoding unit 68 corrects the PUID data for errors. The PUID data, corrected for errors, are output to the communication unit 65. Simultaneously, the communication unit 65 is supplied with selection data, specifying the contents data the user selected from the plural contents data stored in the server device 40. The selection data are output by a controller, not shown, based on data input by the user with the aid of an operating unit, such as plural operating keys, not shown, provided in the data recording and/or reproducing device 60. The communication unit 65 sends the PUID data and the selection data, recorded on the optical disc 10, on which to record the contents data, to the server device 40.

In receiving the contents data corresponding to the selection data, transmitted in advance by the server device 40, the communication unit 65 receives the PUID data, updated by the server device 40, and the contents data corresponding to the selection data, to output these data to the recording processor 66. This recording processor 66 performs signal processing, necessary for recording, on these data, to output the resulting data to the optical pickup 62. The optical pickup 62 records the updated PUID data in the management area 12 of the optical disc 10, kept in rotation by the motor 61, while recording the downloaded contents data in the data recording area 13.

The operation in reproducing the contents data is hereinafter explained. First, when the operation for starting the reproduction is done by the user acting on the operating unit, the motor 61 actuates the optical disc 10, loaded on the disc table. The optical pickup 62 then illuminates a light beam to the recording layer of the rotating optical disc 10 to detect the return light beam reflected back from the recording layer, to access the management area 12 to read out the PUID data prior to the reproduction of the contents data specified by the user. Based on the output signal from the optical pickup 62, RF signals are generated by the RF amplifier 63 and the so generated RF signals are demodulated by the demodulating unit 67. The PUID data, obtained on error correction processing by the error correction decoding unit 68, are input to the demultiplexer 69. The demultiplexer 69 separates the PUID data into the UID data, PA data and the MDC data and outputs the extracted MDC data to the comparator 71 while outputting the UID data and the PA data to the generating unit 70. The generating unit 70 generates MDC data from the UID data and the PA data, input from the demultiplexer 69, using the hash function, and outputs the MDC data to the comparator 71. The comparator 71 has to verify whether or not the access is from the data recording and/or reproducing device 60 of a user owning the authentic optical disc 10. To this end, the comparator 71 compares the MDC data, supplied from the demultiplexer 69, to that supplied from the generating unit 70, to verify whether or not the two coincide with each other. The reason is that, if the PA data indicating the possible recording volume has been changed, the MDC data, output by the generating unit 70, differs from the MDC data separated and extracted by the demultiplexer 69. The comparator 71 compares the MDC data generated in the generating unit 70 to the MDC data extracted by the demultiplexer 69. In case of coincidence of the extracted MDC data and the generated MDC data, the comparator 71 turns on the switching unit 73 to interconnect the error correction decoding unit 68 and the D/A converter 72 to permit reproduction of the contents data selected by the user. In case of non-coincidence of the MDC data generated by the generating unit 70 and the MDC data extracted by the demultiplexer 69, the comparator 71 turns off the switching unit 73 to disconnect the error correction decoding unit 68 and the D/A converter 72 to inhibit reproduction of the contents data.

In case of the coincidence of the two MDC data, the optical pickup 62 accesses a preset address of the data recording area 13, to read out the contents data specified by the user. The data read out by the optical pickup 62 is demodulated and corrected for errors so as to be then output to the D/A converter 72 via the switching unit 73 in the on-state. The contents data, converted into analog signals, are output from the output unit 74.

Figure 12:
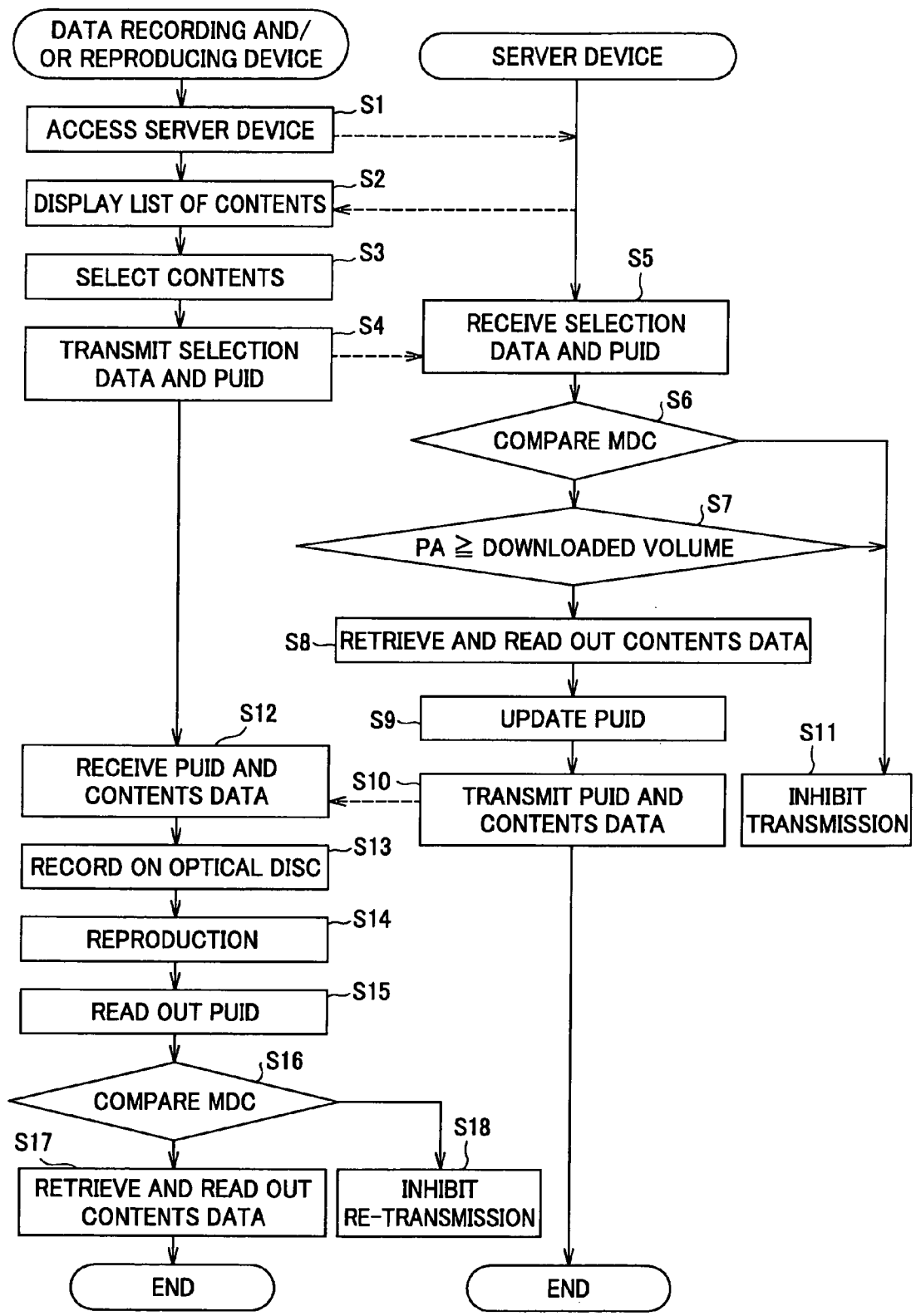
FIG. 12 is a flowchart for illustrating the sequence of operations until a user downloads and reproduces desired contents data.

The sequence of operations until the user downloads the desired contents data in the contents data distributing system 1 employing the server device 40 and the data recording and/or reproducing device 60 is now explained with reference to FIG. 12.

If, in a step S1, the data recording and/or reproducing device 60 accesses the server device 40, responsive to the user's operation, the data recording and/or reproducing device 60 in a step S2 causes a list of downloadable contents data in a display unit, not shown, provided in the device 60. If, in a step S3, the user acts on the operating unit, such as mouse or an operating key, to select desired contents data to be downloaded, as he/she views the display on the display unit, the controller of the data recording and/or reproducing device 60 is responsive to the input from the operating unit to generate selection data specifying the selected contents data.

If, in a step S4, the user acts on the operating unit, not shown, of the data recording and/or reproducing device 60, the device 60 causes the motor 61 to run the optical disc 10 loaded on the disc table in rotation to cause the optical pickup 62 to read out the PUID data recorded in the management area 12. The RF signals, generated by the output signal from the optical pickup, are demodulated by the demodulating unit 67, while the PUID data, obtained on error correction by the error correction decoding unit 68, is output to the communication unit 65. The communication unit sends the PUID data, recorded on the optical disc 10, on which to record the contents data, as well as the selection data for the contents data, to the server device 40.

In a step S5, the communication unit 43 of the server device 40 receives the selection data and the PUID data, transmitted from the data recording and/or reproducing device 60 through a communication network, such as network. The communication unit 43 outputs the PUID data to the demultiplexer 44, while outputting the selection data to the readout detection unit 42. The demultiplexer 44 separates the PUID data, input from the communication unit 43, into the UID data, PA data and the MDC data, and outputs the MDC data to the comparator 46, while outputting the UID data and the PA data to the generating unit 41 and to the update unit 47. The demultiplexer 44 outputs the PA data to the discrimination unit 48 in order to discriminate the recordable volume.

In a step S6, the server device 40 verifies whether or not the transmitted PUID data has been manipulated. That is, the generating unit 45 generates the MDC data, from the UID data and the PA data, input from the demultiplexer 44, using the hash function, and outputs the so generated MDC data to the comparator 46. Prior to reading out the contents data corresponding to the selection data, the comparator 71 has to verify whether or not the access is from the data recording and/or reproducing device 60 of a user owning the authentic optical disc 10. To this end, the comparator 46 compares the MDC data, supplied from the demultiplexer 44, to that supplied from the generating unit 45, to verify whether or not the two coincide with each other. When the MDC data generated by the generating unit 45 is coincident with the MDC data separated and extracted by the demultiplexer 44, the comparator 44 determines that the access is from the data recording and/or reproducing device 60 of an authorized user, and outputs a readout permission signal to the readout detection unit 42. When the MDC data generated by the generating unit 45 is not coincident with the MDC data separated and extracted by the demultiplexer 44, the comparator 44 determines that the access is from the data recording and/or reproducing device 60 of an unauthorized user, and outputs a readout inhibit signal to the readout detection unit 42.

In a step S7, the discrimination unit 48 checks whether or not the contents data specified by the user is downloadable with the current PA. If the contents data is downloadable, the discrimination unit 48 outputs a readout permission signal to the readout detection unit 42. If the PA data is in shortage, the discrimination unit 48 outputs a readout inhibit signal to the readout detection unit 42.

When supplied with the reproduction permission signal from each of the comparator 46 and the discrimination unit 48, the readout detection unit 42 in a step S8 retrieves and extracts the contents data corresponding to the selection data input from the communication unit 43, from among the plural contents data stored in the storage unit 41, to output the so extracted contents data to the communication unit 43.

In a step S9, the update unit 47 updates the PA data, depending on e.g., the number of items of the downloaded contents data, and generates PUID data, transmitted to the data recording and/or reproducing device 60, from the updated PA data and the UID data, using the hash function, to transmit the so generated PUID data to the communication unit 43.

In a step S10, the communication unit 43 sends the updated PUID data, along with the contents data corresponding to the selection data, to the user's data recording and/or reproducing device 60.

When the reproduction inhibit signal is supplied in the steps S6 and S7 from the comparator 46 and from the discrimination unit 48, the readout detection unit 42 does not retrieve contents data corresponding to the selection data. The readout detection unit 42 does not transmit contents data to the data recording and/or reproducing device 60, either.

In a step S12, the communication unit 65 of the data recording and/or reproducing device 60 receives PUID data updated by the server device and contents data corresponding to selection data. In a step S13, the recording processor 66 performs signal processing for recording. With the optical pickup 62, the updated PUID data is recorded in the management area 12, while the contents data is recorded in the data recording area 13.

If, when the contents data recorded in the data recording area 13 of the optical disc 10 is to be reproduced, the user performs, in a step S14, the processing for reproduction by an operating unit, not shown, provided to the recording processor 66, the PUID data is read out in a step S15. That is, the motor 61 actuates the optical disc 10, loaded on the disc table. The optical pickup 62 then causes a light beam to be illuminated on the recording layer of the rotating optical disc 10 to detect the return light beam reflected back from the recording layer to read out the PUID data recorded in the management area 12. Based on the output signal from the optical pickup 62, RF signals are generated and processed with demodulation and error correction to produce PUID data which then is input to the demultiplexer 69. This demultiplexer 69 demultiplexes the PUID data into the UID data, PA data and the MDC data to send the MDC data to the comparator 71 as well as to send the UID data and the PA data to the generating unit 70.

In a step S16, the data recording and/or reproducing device 60 verifies whether or not the PUID data transmitted thereto has been manipulated. That is, the generating unit 70 generates MDC data, from the UID data and the PA data, input from the demultiplexer 69, using the hash function, to output the MDC data to the comparator 71. The comparator 71 has to verify whether or not the access is from the data recording and/or reproducing device 60 of a user owning the authentic optical disc 10. To this end, the comparator 71 compares the MDC data, supplied from the demultiplexer 69, to that supplied from the generating unit 70, to check to see if the two coincide with each other. The comparator 71 compares the MDC data generated in the generating unit 70 to the MDC data separated and extracted by the demultiplexer 69. In case of coincidence of these two MDC data, the comparator 71 turns on the switching unit 73 to interconnect the error correction decoding unit 68 and the D/A converter 72 to permit reproduction of the contents data selected by the user. In a step S17, the optical pickup 62 accesses a predetermined address of the data recording area 13, to read out the contents data, in order to read out the contents data specified by the user. The data read out by the optical pickup 62 is demodulated and corrected for errors so as to be then output to the D/A converter 72 through the switching unit 73 in the on-state. The contents data, converted into analog data, is output at the output unit 74.

If, in the step S16, the MDC data generated in the generating unit 70 is not coincident with the MDC data extracted by the demultiplexer 69, the comparator 71 turns off the switching unit 73 in the step S18 to disconnect the error correction decoding unit 68 and the D/A converter 72 from each other to disable reproduction of the contents data selected by the user to inhibit reproduction of the contents data.

In the present system 1, the MDC data is recorded in this manner in the management area 12 of the optical disc 10 along with the UID data and the PA data, thus assuring facilitated detection even if the UID data or the PA data has been manipulated. Since the PUID data is updated by the server device 40 and not by the data recording and/or reproducing device 60, it is possible to prohibit the PUID data from being manipulated by an unauthorized user. By recording the UID data along with the PA data in the management area 12, the PA data, that is the quantity of consumption by the user, can be managed.

Figure 13:
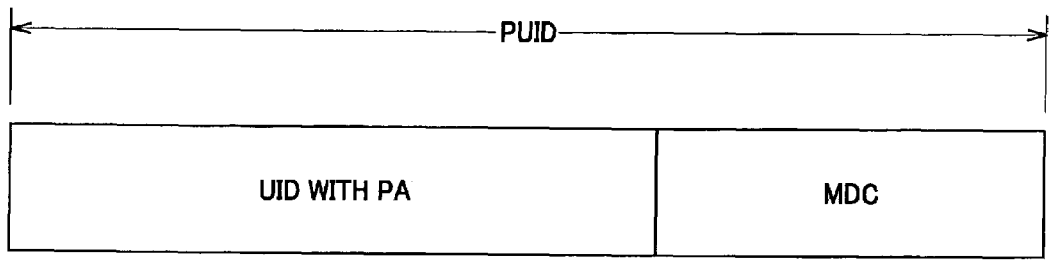
FIG. 13 illustrates another PUID recorded in a management area of the optical disc.

In the above-described embodiment, the PUID data recorded in the management area 12 of the optical disc 10 is composed of the UID data, PA data and the MDC data, as shown in FIGS. 3 and 4. According to the present invention, the PUID data may also be composed of UID data, inclusive of the PA data, and MDC data, as shown in FIG. 13. In this case, the UID data inclusive of the PA data is the data identifying the sort of the optical disc 10, such as ID for 1,000 yen or an ID for 2,000 yen. The MDC data is generated from this UID data inclusive of the PA data using the hash function. In this optical disc 10, it can be detected, by the server device 40 or by the data recording and/or reproducing device 60, whether or not the UID data inclusive of the PA data has been manipulated, with the aid of the MDC data. Of course, data relevant to the MAC data or the CRC data can be used in place of the MDC data.

Figure 14:
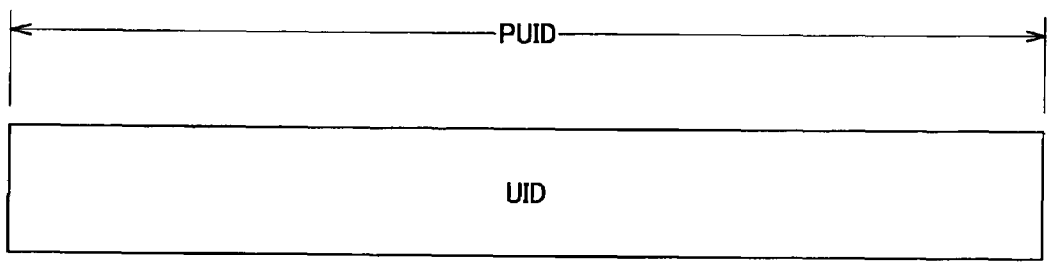
FIG. 14 illustrates another PUID recorded in a management area of the optical disc.

According to the present invention, the UID data can be recorded in the management area 12 of the optical disc 10, as PUID data, as shown in FIG. 14. In this case, the PA data is supervised by the server device 40 supervising the present system 1. That is, PA data for each UID data of each distributed optical disc 10 is stored in the server device 40 and, when the user downloads the contents data by the data recording and/or reproducing device 60, the device 60 transmits the UID data of the optical disc 10, along with the selection data of the contents data, to the server device 40. The server device 40 retrieves the PA data corresponding to the received UID data and verifies from the PA data whether or not the contents data corresponding to the selection data is downloadable. The server device 40 sends the selected contents data to the data recording and/or reproducing device 60 only if the verified results testify to downloading feasibility. Simultaneously, the server device 40 updates the PA data corresponding to the UID data. In this case, the PA data is supervised by the server device 40, while no PA data is recorded on the optical disc 10. Thus, there is no fear of manipulation of the PA data. Consequently, it is unnecessary for the server device 40 to generate the authenticity data, such as MDC data, MAC data or CRC data.

It is similarly possible to record encrypted contents data in the data recording area of the replay-only optical disc and to download encryption key data, used for decoding the encryption of the contents data, with the use of the above-described system 1.

In the foregoing description, the write-once optical disc and the rewritable optical disc are taken as examples for the recording medium. Alternatively, the recording medium may be an IC card, employing a semiconductor memory, a disc cartridge, employing a magnetic disc or a magneto-optical disc, or a tape cassette, employing a magnetic tape.

INDUSTRIAL APPLICABILITY

According to the present invention, described above, manipulation of data recorded on the recording medium for indicating e.g., the recordable volume can be detected easily with authenticity data. In distributing contents data, the identification-data-based recordable volume can be managed by the communication device, such as server device, by transmitting the identification data recorded on the recording medium to the communication device.

The invention claimed is:

1. A method for reproducing data on a recording medium, the method comprising:
    reading out identification data from the recording medium having at least content data and the identification data recorded thereon, said identification data including entity identification data and first detection data, said first detection data:
        being generated using at least said entity identification data, and
        indicating whether or not said entity identification data at least is authentic; generating second detection data based on said identification data;
    comparing first detection data extracted from the identification data to the generated second detection data; and
    permitting the outputting of said content data read out from said recording medium when results of the comparing indicate correlation of said first detection data with the generated second detection data.

2. The reproducing method according to claim 1 wherein:
    when the results of the comparing indicate non-correlation of said first detection data with the generated second detection data, preventing the outputting of the content data from said recording medium.

3. The reproducing method according to claim 1 wherein:
    said identification data includes volume data indicating a volume of data recordable on said recording medium, said volume data generating said first detection data along with said entity identification data; said second detection data being generated based on the entity identification data of said identification data and on said volume data.

4. An apparatus for reproducing a recording medium, the apparatus comprising:
    a head unit for scanning the recording medium having at least content data and identification data recorded thereon, said identification data including entity identification data and first detection data, said first detection data:
        being generated using at least said entity identification data, and
        indicating whether or not said entity identification data at least is authentic;
    a signal processing unit for performing signal processing for reproducing an output signal from said head unit;
    a generating unit for generating second detection data based on said entity identification data; and
    a comparator for comparing the first detection data to the second detection data; and
    an outputting unit for limiting the outputting of the output signal from said signal processing unit based on data derived from comparison results from said comparator.

5. The apparatus for reproducing a recording medium according to claim 4 wherein:
    when the first detection data correlates with the second detection data, said comparator controls said output unit to output the output signal from said signal processing unit.

6. The apparatus for reproducing a recording medium according to claim 4 wherein:
    when the first detection data does not correlate with the second detection data, said comparator controls said output unit to prevent the outputting of the output signal from said signal processing unit.

7. The apparatus for reproducing a recording medium according to claim 4 wherein:
    said identification data includes volume data indicating a volume of data recordable on said recording medium;
    said generating unit generating second detection data based on the entity identification data and further based on said volume data.

8. The apparatus for reproducing a recording medium according to claim 7 wherein said generating unit generates second detection data using a unidirectional function.

9. A method for recording a recording medium, the method comprising:
   transmitting identification data read out from the recording medium having at least entity identification data, volume data indicating a volume of recordable data, and first detection data recorded thereon, wherein said first detection data:
      is generated using said entity identification data and said volume data, and
      indicates whether at least said entity identification data and said volume data are authentic; and
   recording updated identification data, including updated volume data, transmitted along with content data, on a recording medium.

10. The method for recording a recording medium according to claim 9 wherein said recording medium includes a content data recording area for recording said content data and a management data area for recording said identification data, the method comprising:
   recording said content data in said content data recording area; and
   recording the updated identification data inclusive of updated volume data, in said management area.

11. A data recording method comprising:
   reading out identification data from a recording medium having at least said identification data recorded thereon, said identification data including entity identification data and at least first detection data, said first detection data:
      being generated using at least said entity identification data, and
      indicating whether said entity identification data at least is authentic;
   transmitting read-out identification data and selection data to a server device holding plural data;
   said server device:
      generating second detection data based on said entity identification data of said identification data,
      comparing generated second detection data and first detection data and,
      reading out and transmitting content data corresponding to said selection data in case of correlation of the generated second detection data and the first detection data; and
   recording the transmitted content data on or reproducing the transmitted content data from said recording medium.

12. The data recording method according to claim 11 wherein said server device prevents readout of said content data corresponding to said selection data in case of non-correlation of the generated second detection data and the first detection data.

13. The data recording method according to claim 11 wherein said identification data includes volume data indicating a volume of data recordable on said recording medium, said volume data being further used to generate said first detection data along with said entity identification data, said server device generating said second detection data based on said entity identification data of the identification data read out and on said volume data.

14. The data recording method according to claim 13 wherein said server device generates said second detection data using a unidirectional function.

15. The data recording method according to claim 13 wherein said server device checks the volume data to see if said volume is sufficient to record content data corresponding to said selection data on said recording medium in case of correlation of the generated second detection data and the first detection data.

16. The data recording method according to claim 15 wherein said server device reads out and transmits content data corresponding to said selection data if said data volume data indicates that the content data corresponding to said selection data is recordable.

17. The data recording method according to claim 16 wherein said server device updates said volume data and transmits said identification data inclusive of updated volume data and the content data corresponding to said selection data.

18. The data recording method according to claim 16 further comprising:
   recording on said recording medium said identification data inclusive of updated volume data and the content data corresponding to said selection data.

19. The data recording method according to claim 15 wherein said server device prevents readout of said content data corresponding to said selection data if said volume data indicates that recording of the content data corresponding to said selection data on said recording medium is impossible.

20. The data recording method according to claim 11 wherein said identification data is read out from said recording medium, the first detection data is generated based on the entity identification data of said identification data, the first detection data is compared to the generated second detection data and the outputting of the content data from the recording medium is permitted when comparison results indicate that the first detection data correlates with the generated second detection data.

21. The data recording method according to claim 20 wherein:
   when the comparison results indicate that the first detection data does not correlate with the generated second detection data, the outputting of the content data read out from the recording medium is prohibited.

22. The data recording method according to claim 20 wherein said identification data includes volume data indicating the volume of data recordable on said recording medium, said volume data generating said first detection data along with said entity identification data, and wherein said second detection data is generated based on said entity identification data of the identification data read out and on said volume data.

23. The data recording method according to claim 22 wherein said second detection data is generated using a unidirectional function.

24. A recording medium comprising:
   a data recording area where content data is recorded; and
   a management data area where there is recorded identification data inclusive of entity identification data and detection data generated using at least said entity identification data, said detection data indicating whether or not the entity identification data at least is authentic;
   wherein said management data area includes volume data indicating the volume of data recordable on said recording medium, and wherein said detection data is generated using at least the entity identification data and said volume data.

25. The recording medium according to claim 24 wherein said detection data is generated by a unidirectional function.

26. A recording apparatus for a recording medium, said apparatus comprising:
- a head unit for scanning said recording medium having identification data recorded thereon, said identification data including entity identification data and first detection data, said first detection data being generated using at least said entity identification data and indicating whether or not said entity identification data at least is authentic;
- a signal processing unit for performing signal processing for reproducing an output signal from said head unit;
- a communication unit for transmitting selection data and the identification data read out from said head unit and for receiving transmitted content data corresponding to said selection data;
- a generating unit for generating second detection data based on said entity identification data;
- a comparator unit for comparing the first detection data extracted from the read-out identification data and the second detection data generated by said generating unit;
- an outputting unit supplied with the output signal from said signal processing unit and adapted for controlling the outputting of the output signal from said signal processing unit based on comparison results from said comparator; and
- a recording signal processing unit for recording on said recording medium the content data corresponding to said selection data received via said communication unit via said head unit.

27. The recording apparatus for a recording medium according to claim 26 wherein:
- when the first detection data extracted from the identification data read out correlates with said generated second detection data, said comparator controls said outputting unit to output the output signal from said signal processing unit.

28. The recording apparatus for a recording medium according to claim 26 wherein:
- when the first detection data extracted from the identification data read out does not correlate with said generated second detection data, said comparator controls said outputting unit to prevent the output of the output signal from said signal processing unit.

29. The recording apparatus for a recording medium according to claim 26 wherein:
- said identification data includes volume data indicating the volume of data recordable on said recording medium;
- said generating unit generates second detection data based on the entity identification data of said identification data read out and on said volume data.

30. The recording apparatus for a recording medium according to claim 29 wherein said generating unit generates second detection data using a unidirectional function.

31. The recording apparatus for a recording medium according to claim 29 wherein said identification data inclusive of updated volume data, transmitted along with said selected data, is recorded on said recording medium.

* * * * *